United States Patent
Van Der Velde et al.

(10) Patent No.: US 10,912,139 B2
(45) Date of Patent: Feb. 2, 2021

(54) NETWORK INTERCONNECTIVITY

(71) Applicant: Samsung Electronics Co., Ltd., Suwon-si (KR)

(72) Inventors: Himke Van Der Velde, Zwolle (NL); Gert Jan Van Lieshout, Apeldoorn (NL); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 3 days.

(21) Appl. No.: 16/318,985

(22) PCT Filed: Jul. 18, 2017

(86) PCT No.: PCT/KR2017/007731
§ 371 (c)(1),
(2) Date: Jan. 18, 2019

(87) PCT Pub. No.: WO2018/016853
PCT Pub. Date: Jan. 25, 2018

(65) Prior Publication Data
US 2019/0281645 A1   Sep. 12, 2019

(30) Foreign Application Priority Data

Jul. 18, 2016 (GB) .................................. 1612428.1
Aug. 16, 2016 (GB) .................................. 1613972.7
(Continued)

(51) Int. Cl.
*H04W 76/15* (2018.01)
*H04W 8/24* (2009.01)
(Continued)

(52) U.S. Cl.
CPC ............... *H04W 76/15* (2018.02); *H04L 5/00* (2013.01); *H04W 8/24* (2013.01);
(Continued)

(58) Field of Classification Search
CPC ... H04W 76/15; H04W 8/24; H04W 28/0125; H04W 48/18; H04W 88/06; H04L 5/00
See application file for complete search history.

(56) References Cited

U.S. PATENT DOCUMENTS

2014/0023013 A1    1/2014  Lee et al.
2014/0329526 A1   11/2014  Sundararajan et al.
(Continued)

FOREIGN PATENT DOCUMENTS

WO    2014/182714 A1   11/2014
WO    2015/065129 A1    5/2015
WO    2016/078969 A1    5/2016

OTHER PUBLICATIONS

ETSI Technical Report; ETSI TR 138912, May 5, 2017, European Telecommunications Standards Institute (ETSI), 650, route des Lucioles, F-06921 Sophia-Antipolis Cedex, France, "5G; Study on New Radio (NR) access technology" XP014291080.
(Continued)

Primary Examiner — Ricky Q Ngo
Assistant Examiner — Stephen N Steiner
(74) Attorney, Agent, or Firm — Jefferson IP Law, LLP

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. Disclosed is a method of operating a telecommunication system operating in a multi-connectivity configuration, wherein a first node operates a first radio connection using a first Radio Access Technology, RAT, and a second
(Continued)

| Configuration | CC (RAT) | CC (RAT) | CC (RAT) | Remarks |
|---|---|---|---|---|
| Option 1 | CC1 (LTE) | 25% | 400 | 1 MIMO layer, 2 CSI processes |
|  | CC2 (NR) | 75% | 1200 | 2 MIMO layer, 4 CSI processes |
| Option 2 | CC1 (LTE) | 70% | 800 | 3 MIMO layer, 6 CSI processes |
|  | CC2 (NR) | 30% | 400 | 1 MIMO layer, 1 CSI processes | node operates a second radio connection using a second RAT, wherein a User Equipment, UE, operable to communicate over first and second radio connections, is configured on the basis of its capabilities with respect to the first node and its capabilities with respect to the second node.

16 Claims, 20 Drawing Sheets

(30) Foreign Application Priority Data

Nov. 4, 2016 (GB) .................................. 1618640.5
Jan. 6, 2017 (GB) .................................. 1700242.9

(51) Int. Cl.
*H04W 28/02* (2009.01)
*H04W 48/18* (2009.01)
*H04W 88/06* (2009.01)
*H04L 5/00* (2006.01)
*H04W 92/20* (2009.01)

(52) U.S. Cl.
CPC ....... *H04W 28/0215* (2013.01); *H04W 48/18* (2013.01); *H04W 88/06* (2013.01); *H04W 92/20* (2013.01)

(56) References Cited

U.S. PATENT DOCUMENTS

| | | | |
|---|---|---|---|
| 2014/0335882 A1 | 11/2014 | Lee et al. | |
| 2015/0124748 A1 | 5/2015 | Park et al. | |
| 2015/0327107 A1 | 11/2015 | Kim et al. | |
| 2016/0021695 A1* | 1/2016 | Axmon | H04W 24/08 370/329 |
| 2016/0337904 A1* | 11/2016 | Hsu | H04W 28/12 |
| 2017/0331670 A1* | 11/2017 | Parkvall | H04J 11/0056 |
| 2017/0339555 A1* | 11/2017 | Henttonen | H04W 8/245 |

OTHER PUBLICATIONS

UK Search Report dated Jan. 2, 2019 issued in UK Patent Application No. GB1711503.1.
Intel Corporation, "RRC aspects for LTE-NR interworking", 3GPP Draft; R2-163587, 3rd Generation Parternership Project (3GPP), Mobile Competence Centre; 650, Route Des Lucioles, F-06921 Sophia-Antipolis Cedex, France, vol. RAN WG2, No. Nanjing, China, May 23, 2016-May 27, 2016, May 22, 2016, XP051105036.
Itri, "UE Capabilities Issues for tight interworking between NR and LTE", 3GPP Draft; R2-163791, 3rd Generation Partnership Project (3GPP), Mobile Competence Centre; 650, Route Des Lucioles, F-06921 Sophia-Antipolis Cedex, France, vol. RAN WG2, No. Nanjing, China, May 23, 2016-May 27, 2016, May 22, 2016, XP051105198.
Ericsson, "Overview of RRC architecture options for the LTE-NR tight interworking", 3GPP Draft; R2-164005, 3rd Generation Partnership Project (3GPP), Mobile Competence Centre; 650, Route Des Lucioles, F-06921, vol. RAN WG2, No. Nanjing, P.R. China, May 23, 2016-May 27, 2016, May 22, 2016, XP051105340.
Samsung, "Co-existence scenarios for LTE and NR", 3GPP Draft; R2-163776, NR Co-Existence Final, 3rd Generation Partnership Project (3GPP), Mobile Competence Centre; 650, Route Des Lucioles, F-06921 Sophia-Antipolis Cedex, France, vol. RAN WG2, No. Nanjing, China, May 23, 2016-May 27, 2016, May 22, 2016, XP051105184.
European Search Report dated Jan. 23, 2019, issued in European Patent Application No. 17831326.8.
"3rd Generation Partnership Project; Technical Specification Group Radio Access Network; Evolved Universal Terrestrial Radio Access (E-UTRA); Radio Resource Control (RRC); Protocol specification (Release 12)", 3GPP Standard; 3GPP TS 36.331, Mar. 30, 2016, XP051088478.
European Office Action dated Sep. 8, 2020, issued in European Application No. 17831326.8-1212.

* cited by examiner

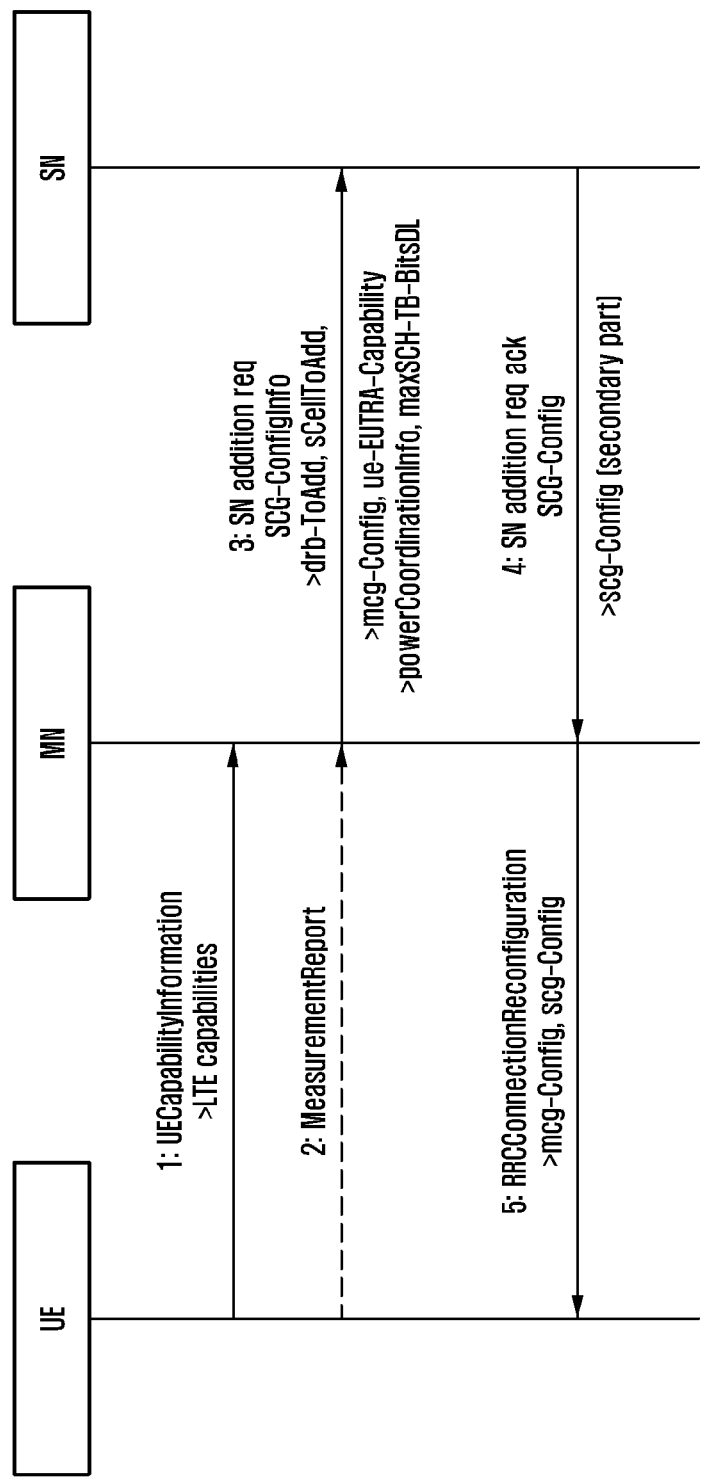

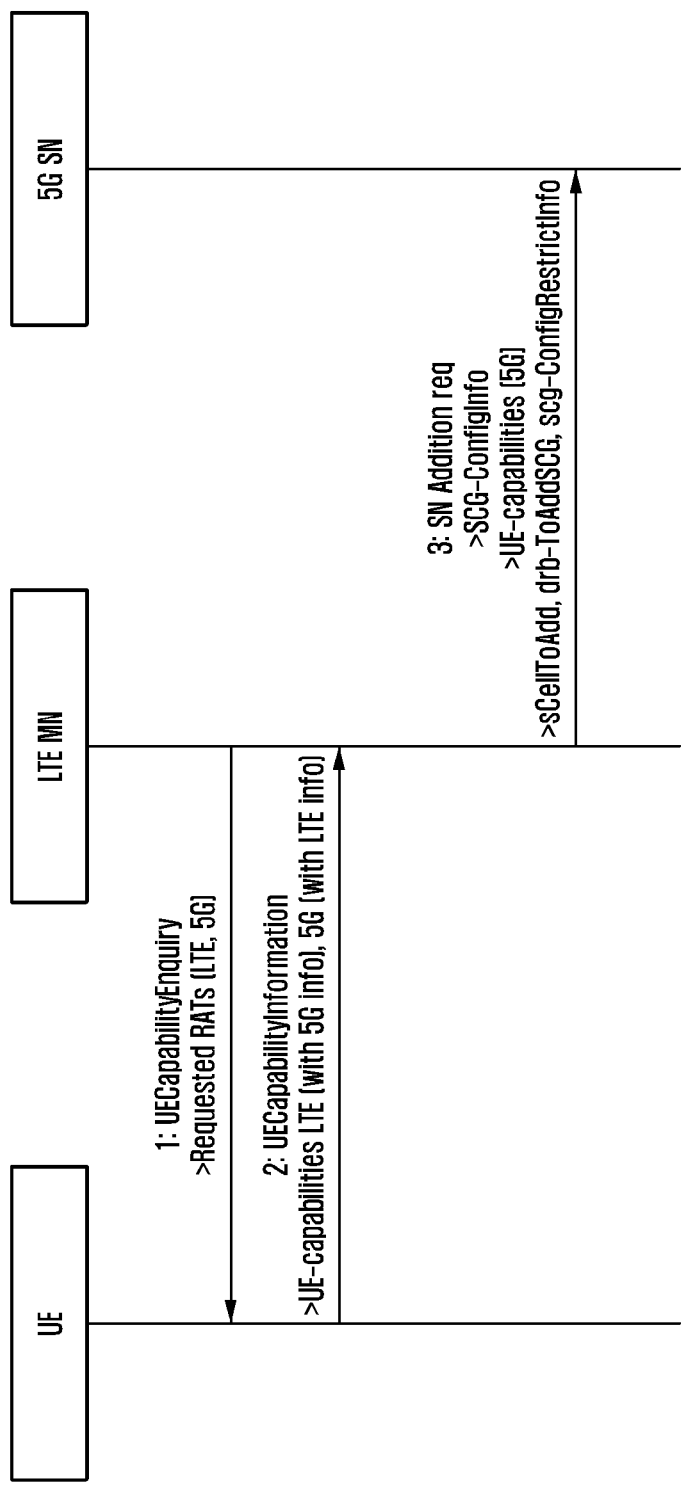
[Fig. 2]

[Fig. 3]
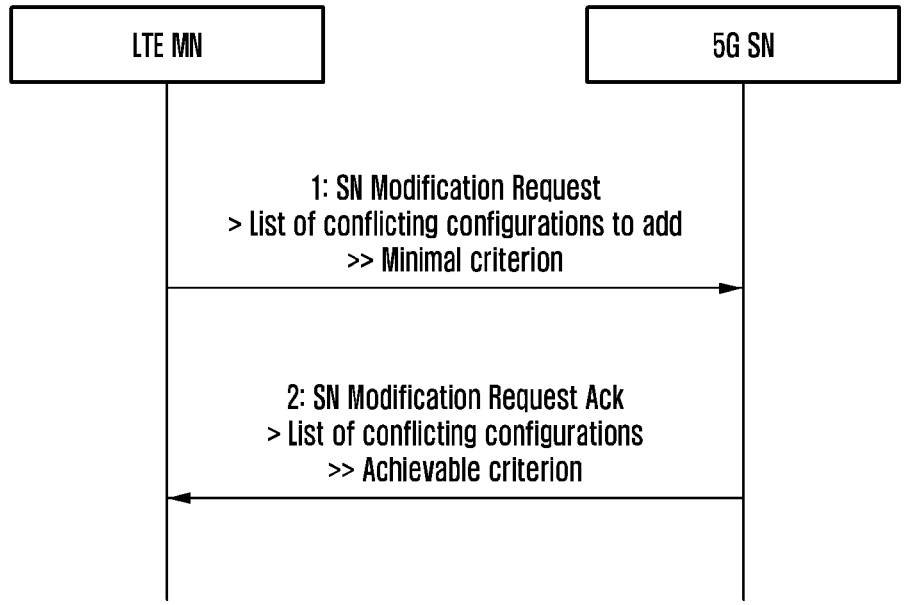
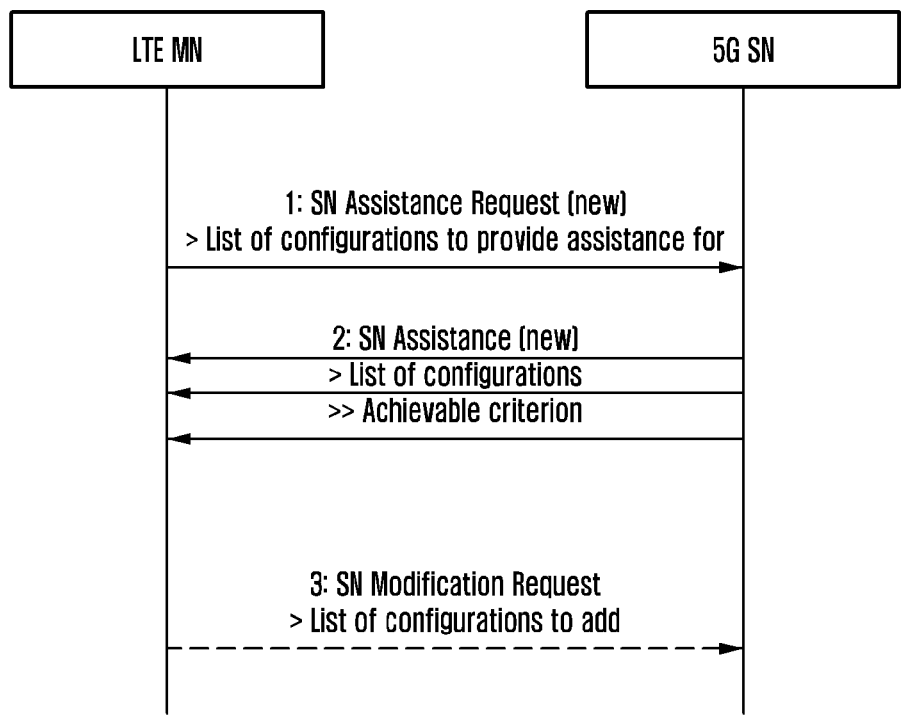

[Fig. 4]
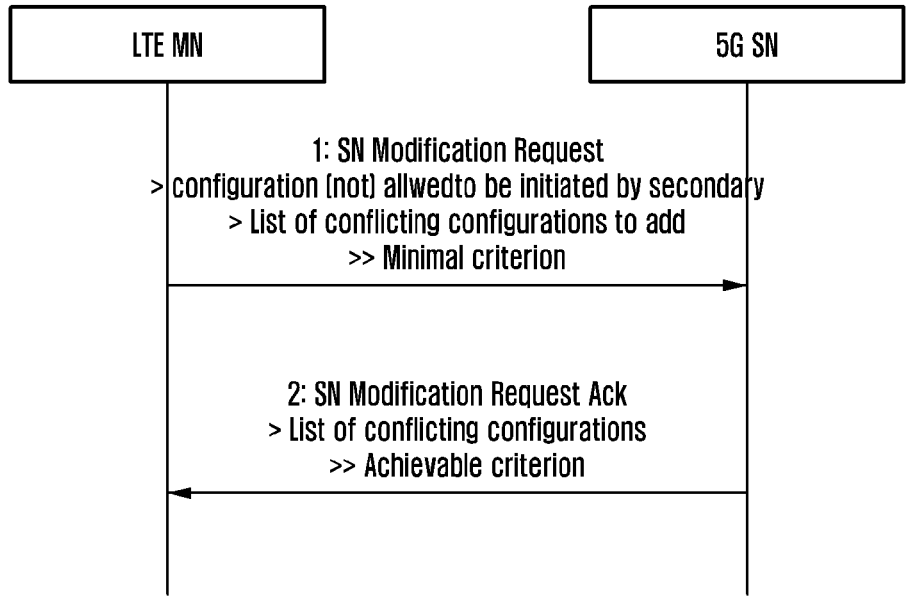
[Fig. 5]
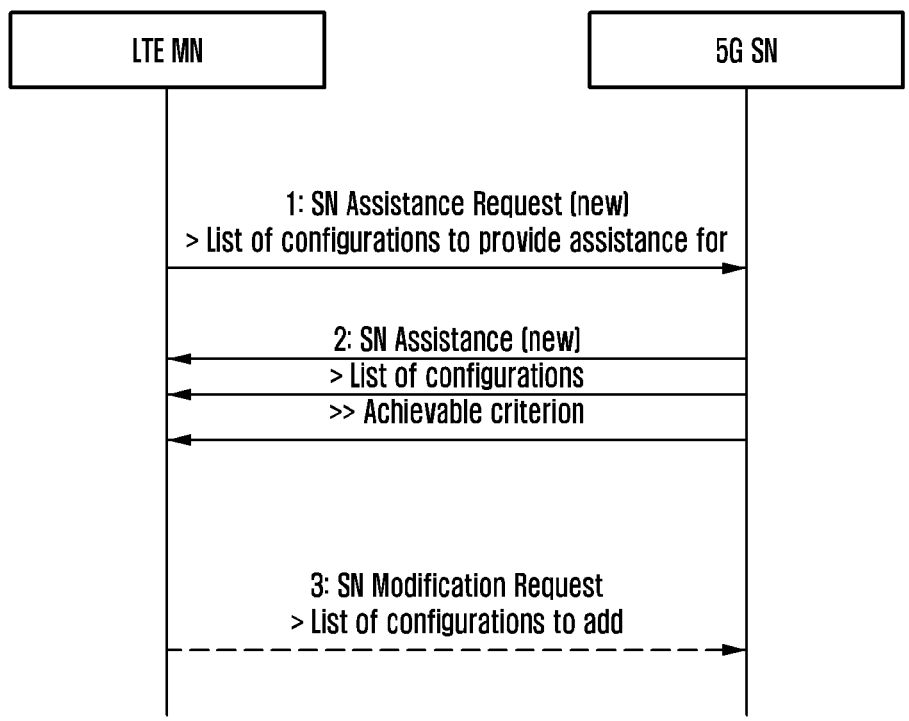

[Fig. 6]
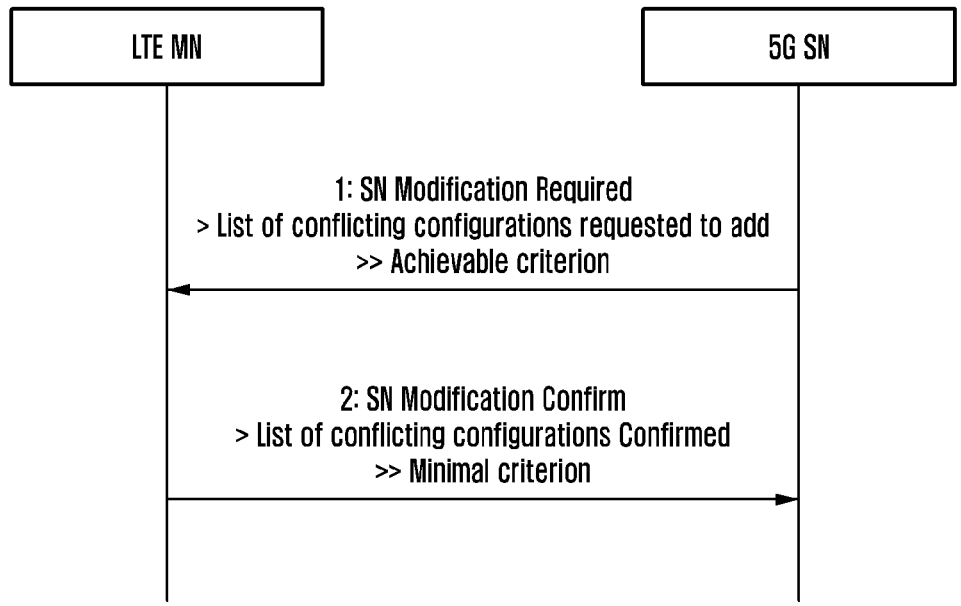
[Fig. 7]
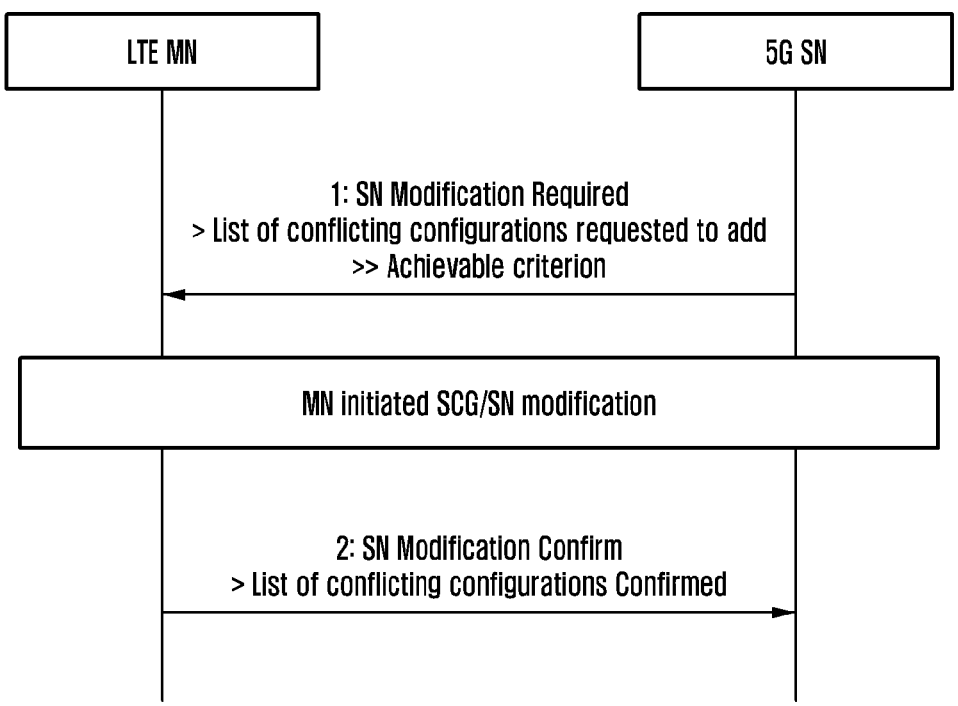

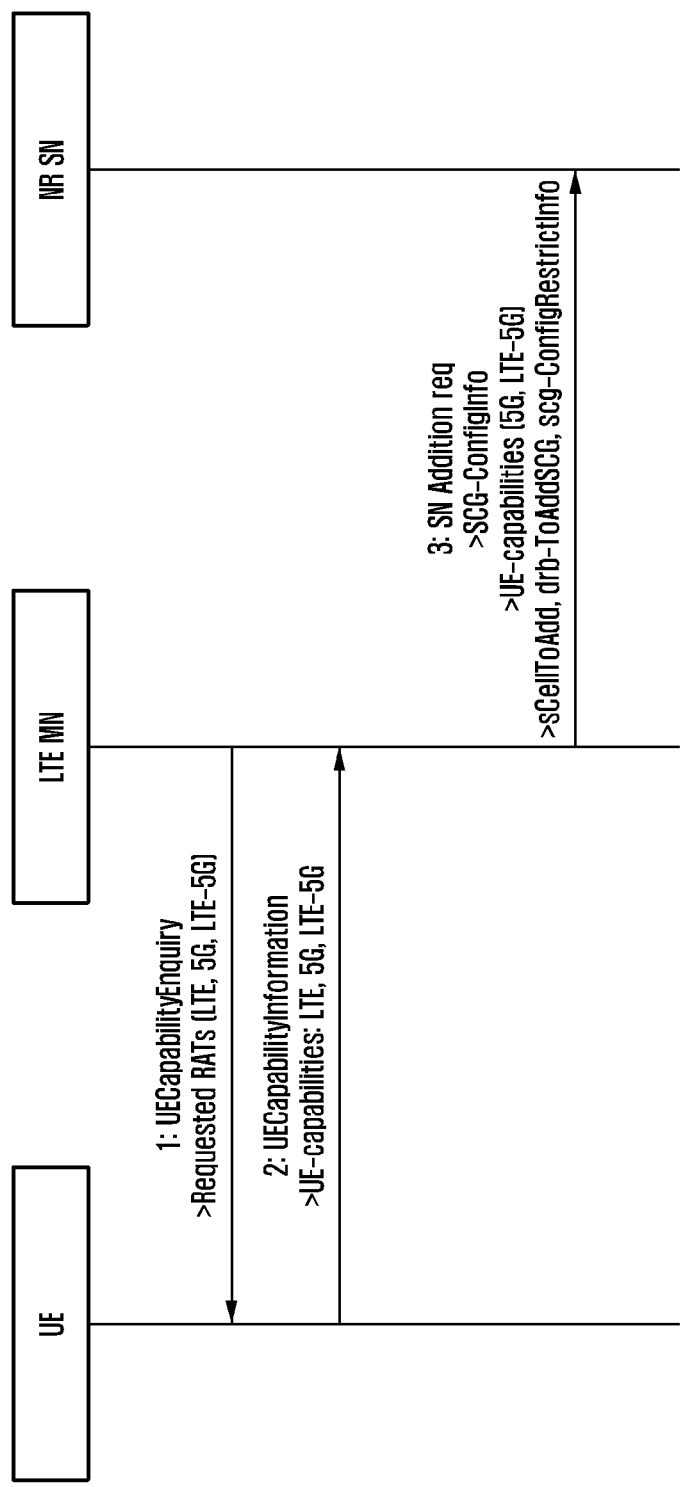

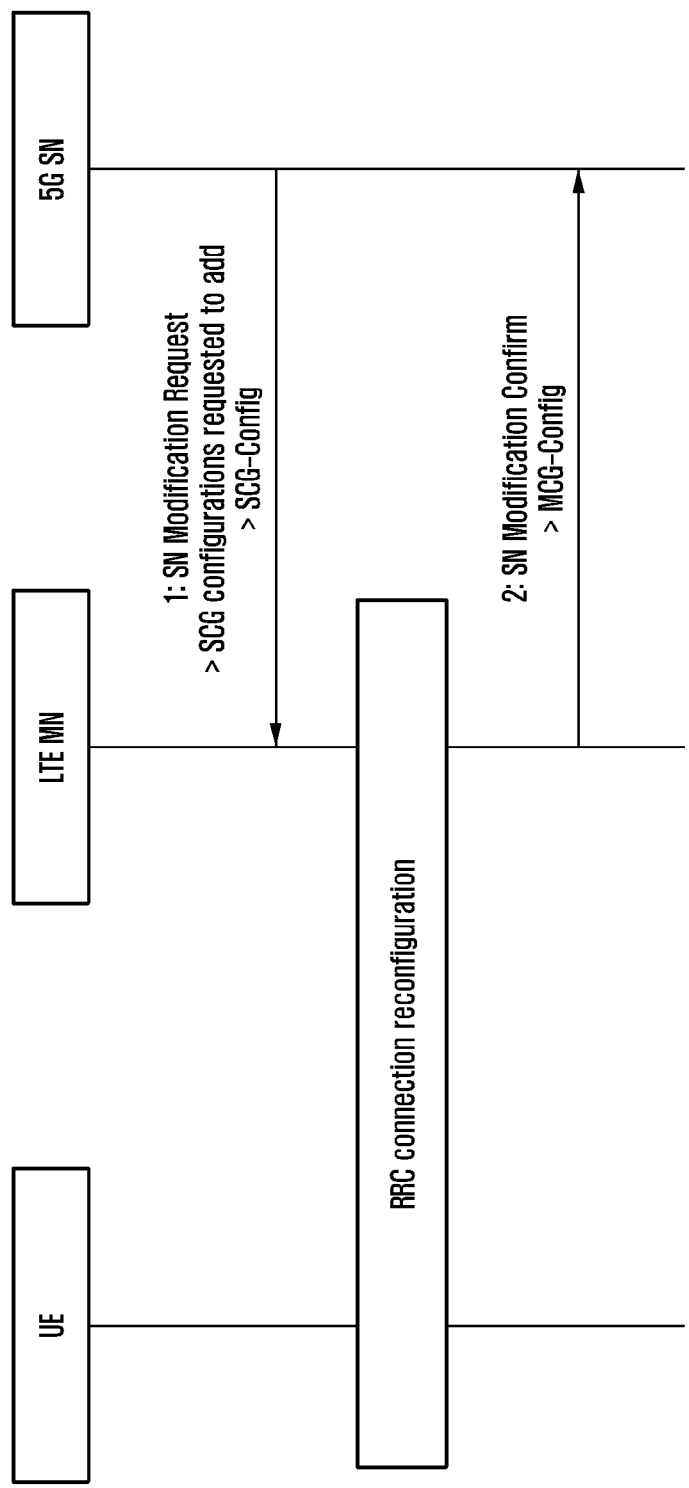
[Fig. 9]

[Fig. 10]
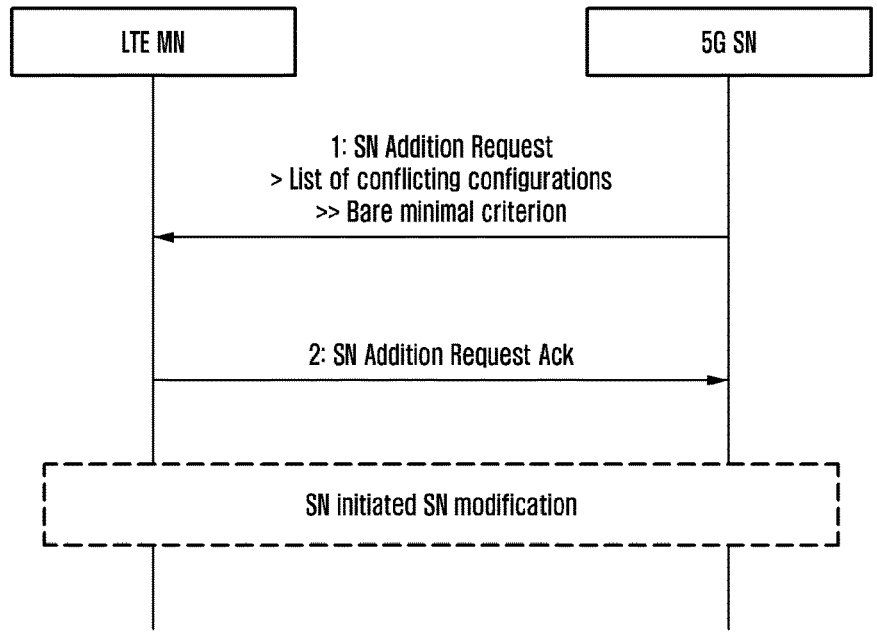
[Fig. 11]
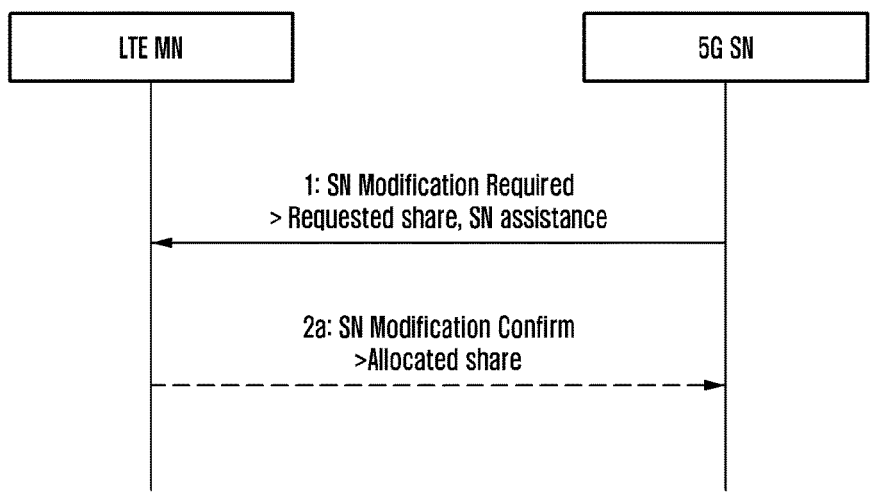
[Fig. 12]
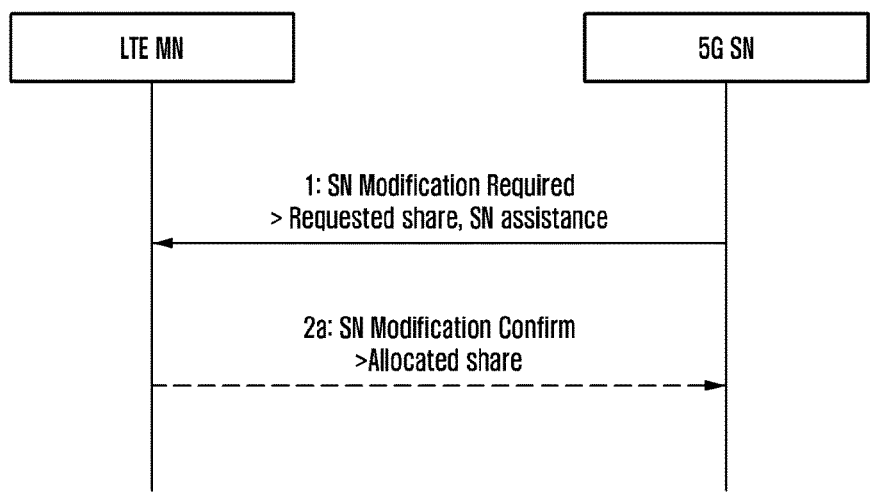

[Fig. 13]

| Configuration | CC (RAT) | | CC (RAT) | CC (RAT) | Remarks |
|---|---|---|---|---|---|
| Option 1 | CC1 (LTE) | | 25% | 400 | 1 MIMO layer, 2 CSI processes |
| | CC2 (NR) | | 75% | 1200 | 2 MIMO layer, 4 CSI processes |
| Option 2 | CC1 (LTE) | | 70% | 800 | 3 MIMO layer, 6 CSI processes |
| | CC2 (NR) | | 30% | 400 | 1 MIMO layer, 1 CSI processes |

[Fig. 14]
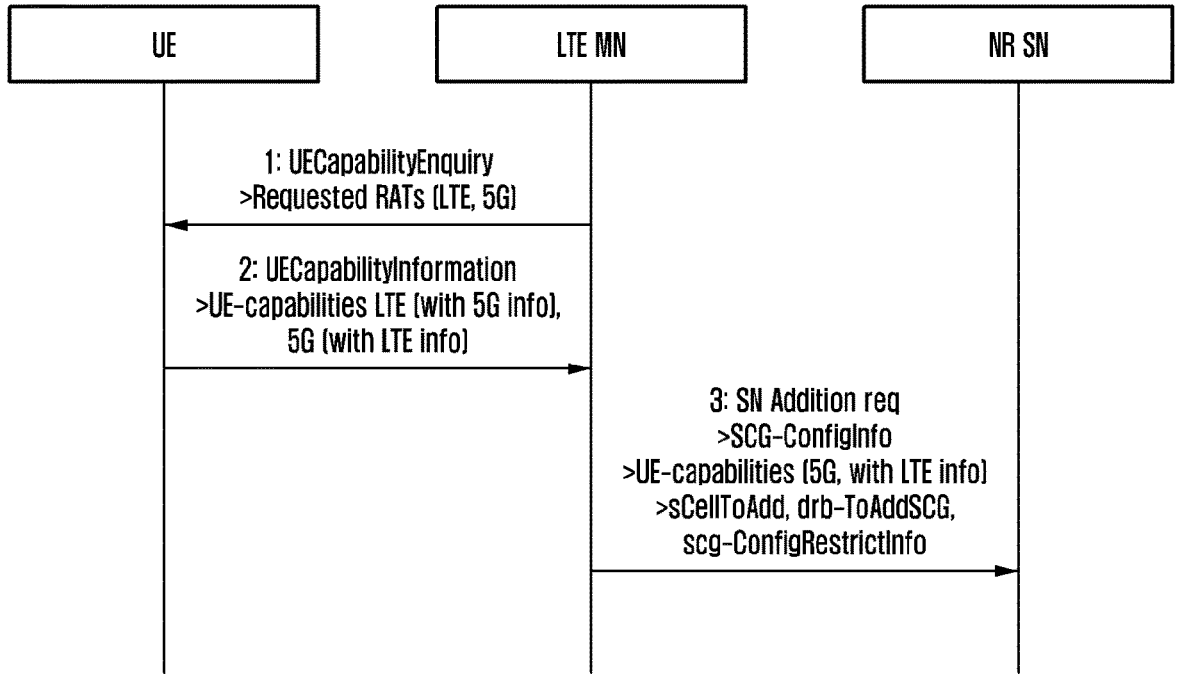
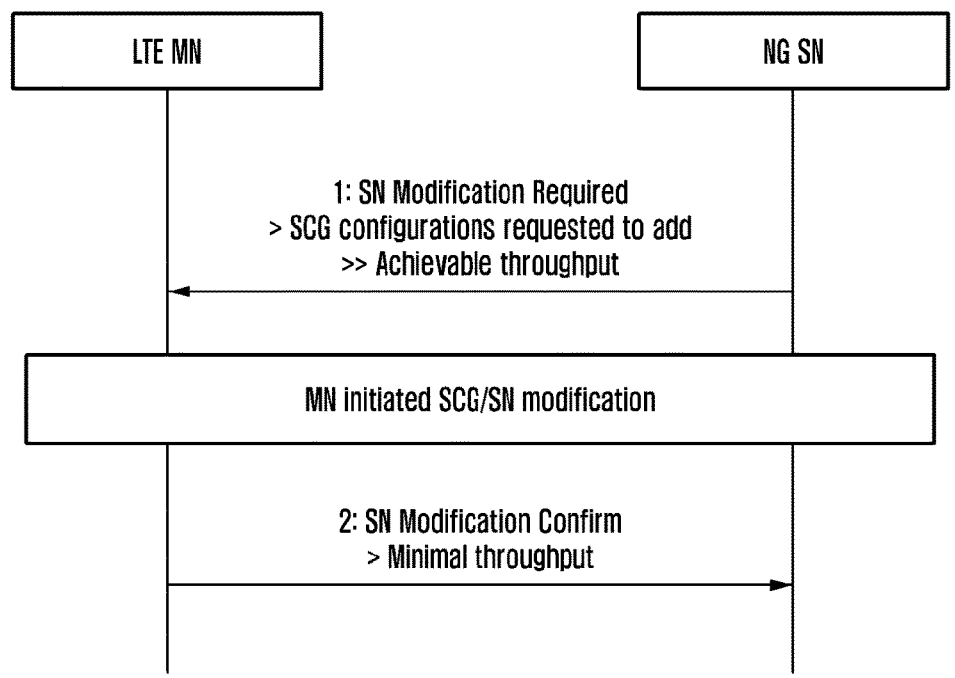

[Fig. 15]
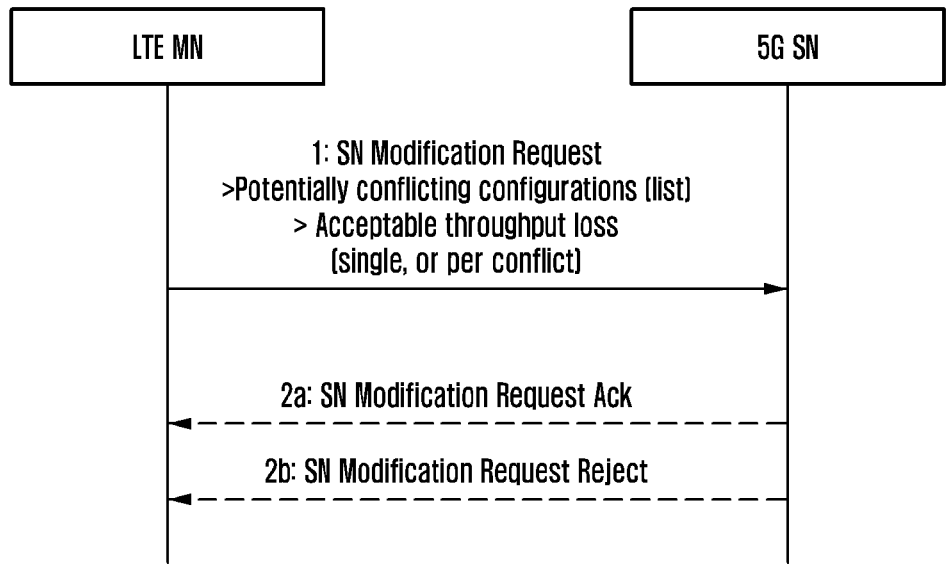
[Fig. 16]
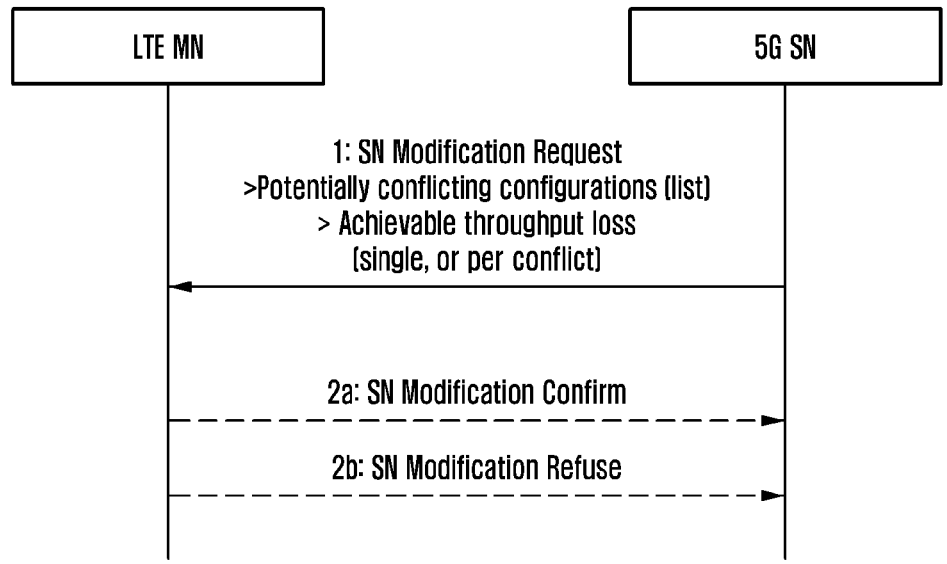

[Fig. 17]

|  |  | 4BC1 | 4BC2 | 4BC3 | 4BC4 | 4BC5 |
|---|---|---|---|---|---|---|
|  |  | 4B1+4B1 | 4B1+4B2 | 4B1+4B3 | 4B2+4B2 | 4B2+4B3 |
| 5BC1 | 5B1+5B1 |  | B conflict |  | B conflict | B conflict |
| 5BC2 | 5B1+5B2 |  | B conflict |  | B conflict | B&BC conflict |
| 5BC3 | 5B2+5B2 |  |  |  |  |  |
| 5BC4 | 5B2+5B3 |  |  |  |  |  |
| 5BC5 | 5B1+5B2+5B3 | BC conflict | B conflict |  |  |  |

[Fig. 18]

| Scenario | Option 1 | Option 2 | Comparison |
|---|---|---|---|
| Choose | Add SCG cell on 5B1 (and release MCG cell on 4B2) | Keep MCG cell on 4B2 and not add SCG cell on 5B1 | Compare gain of SCG cell with loss of MCG cell |
| Divert | Add MCG cell on 4B2 and divert SCG cell to 4B3 | No change i.e. keep SCG cell on 5B2 (and do not add MCG cell) | Compare gain MCG cell with loss associated with diversion SCG cell |
| Divert with side effect i.e. requires modification of other cell also | Add MCG cell on 4B2 and divert SCG cell 1 to 4B3 while reducing SCG cell 2 bandwidth, MIMO layers or #CSI processes | No change i.e. keep SCG cell on 5B2 (and do not add MCG cell) | Compare gain MCG cell with loss associated with diversion/modification SCG cells |

[Fig. 19]

| Scenario | Example | Option 1 | Option 2 | Remarks |
|---|---|---|---|---|
| Independent conflicts | Two independent choices of configuring Scell in LTE or NR (i.e. 2 sets of conflicting bands) | 1: Add SCG cell on 5B1 (and release MCG cell on 4B2) 2: Add SCG cell on 5Bm (and release MCG cell on 4Bn) | 1: Keep MCG cell on 4B2 and not add SCG cell on 5B1 2: Keep MCG cell on 4Bn and not add SCG cell on 5Bm | Can be handled independently - i.e. separate signalling per conflict |
| Dependent conflicts: Adding 2 LTE cells, resulting in both conflicting band and BC ( involving same band) | MCG has cell on 4B2, SCG on 5B2 SN wants to add cells on 5B1 and 5B3 Addition of SCG cell on 5B1 results in band conflicts (with 4B2). Addition of SCG cells on 5B1 and 5B3 additionally results in conflict with 4BC1 | (highest throughput first) 1: Add SCG cell on 5B1 & 5B3 and divert MCG cell from 4B2 to 4B3 2: Add SCG cell on 5B1 and divert MCG cell from 4B2 to 4B3) | 1: Only add SCG cell on 5B3 (and not modify MCG) 2: No change | For choice 1, SN should report the additional throughput of adding both SCG cells (i.e. on 5B1 & 5B3) For choice 2, SN should report additional throughput of cell on 5B1 |
| Dependent conflicts: Two diversions with related side effects (see previous slide) | Best alternative for the conflict is not possible together | 1: Add MCG cell on 4B2 and divert SCG cell 1 to 4B3 while reducing SCG cell 2 MIMO layers 2: Add SCG cell on 5Bm divert SCG cell 1 to 4B3 while reducing SCG cell x MIMO layers |  | SCG can choose its own preferred reconfiguration i.e. either initiate 1 of 2 within option 1 row. This may not result in higher overall throughput though |

[Fig. 20]

| Event | Resulting config | Common aspects | RT per conflict | Single value (TRT) |
|---|---|---|---|---|
| Initially setup IRAT BC of 4B1+5B1 | 4B1+5B1 | Configure limit for 5B1, as it introduces potential conflict i.e. configurations including 4B2 cannot be Configured. As there is no alternative, low value is set | MN sets RT for 5B1 to 5Mbps | MN sets TRT to 5Mbps |
| UE provides measurment report indicating availability of suitable cell on 4B2 | No change | As now there now is a real alternative, MN sets a more appropriate RT value | MN sets RT for 5B1 to 20Mbps | MN sets TRT to 20Mbps |
| SN requests SC addition on 5BC2, indicating it can achieve 250Mbps for this BC | 4B3+5B1+5B2 | MN configures additional limit i.e. it sets a realistic RT for 5BC2 (5B1+5B2), as it inhibits configuration of the real alternative 4BC5. Note that MN needs to change Pcell to BC3 (should have measurement configured) | MN sets RT for 5BC2 to 20Mbps | MN sets TRT to 220Mbps |
| Rate MN can achieve for 5BC2 drops to below 200Mbps | 4B1+5B1 | None | SN initiates release of cell on 5B2 | SN reports failure and indicate AT per conflict i.e. 25Mbps for 5B1 and 200Mbps for 5BC2. MN correspondingly initiates release of cell on 5B2 |

[Fig. 21]
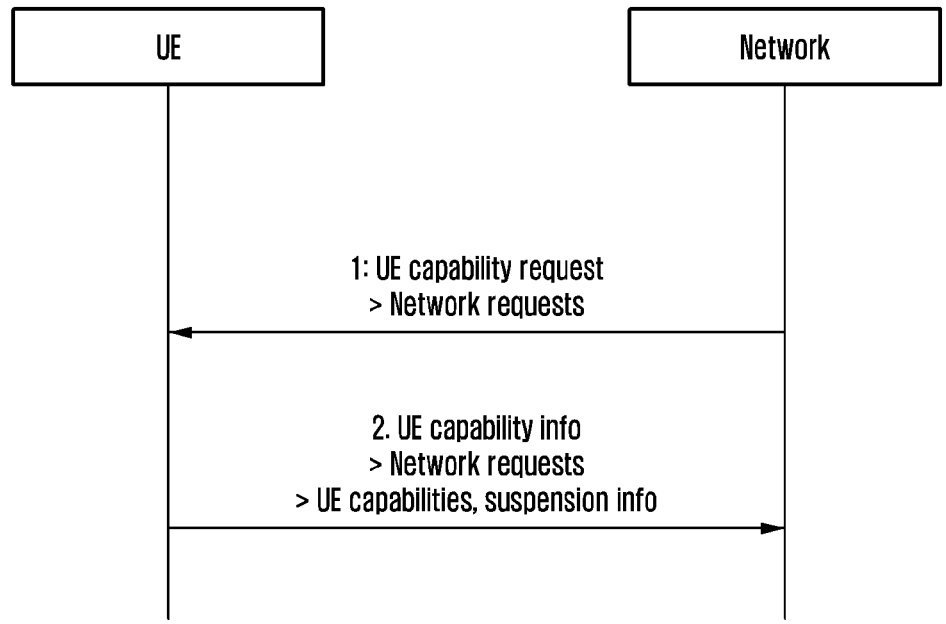
[Fig. 22]
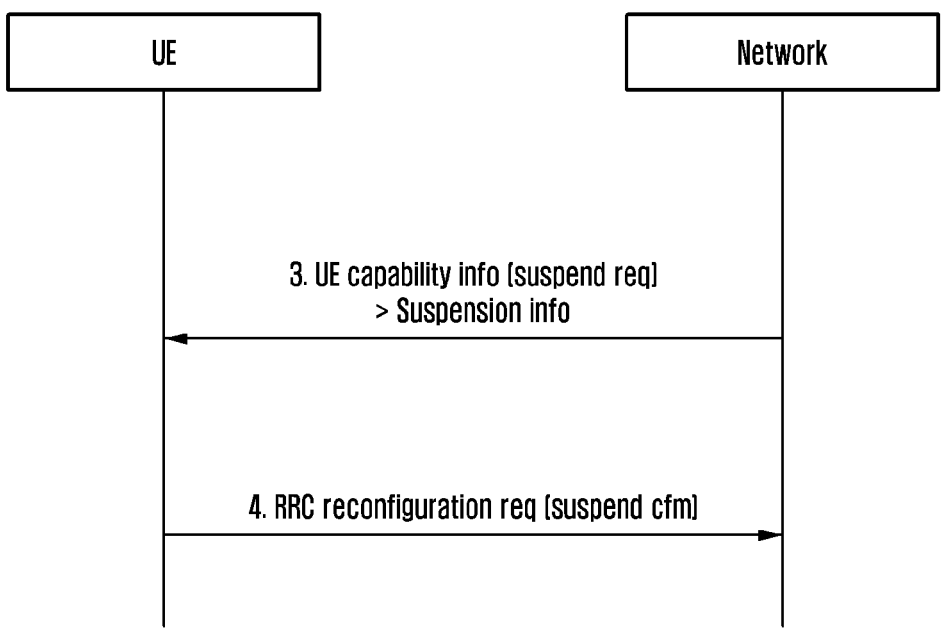

[Fig. 23]
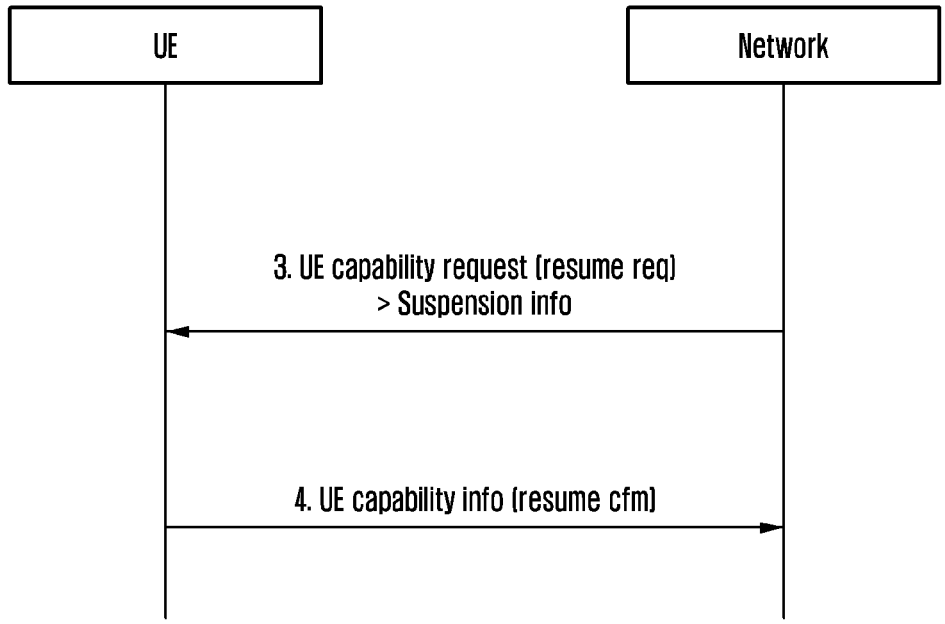
[Fig. 24]
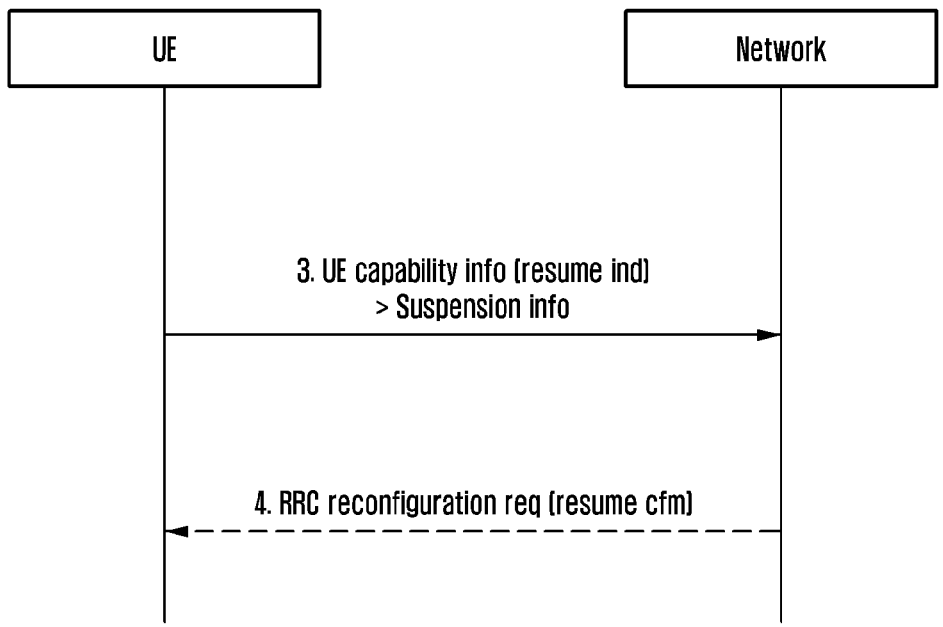

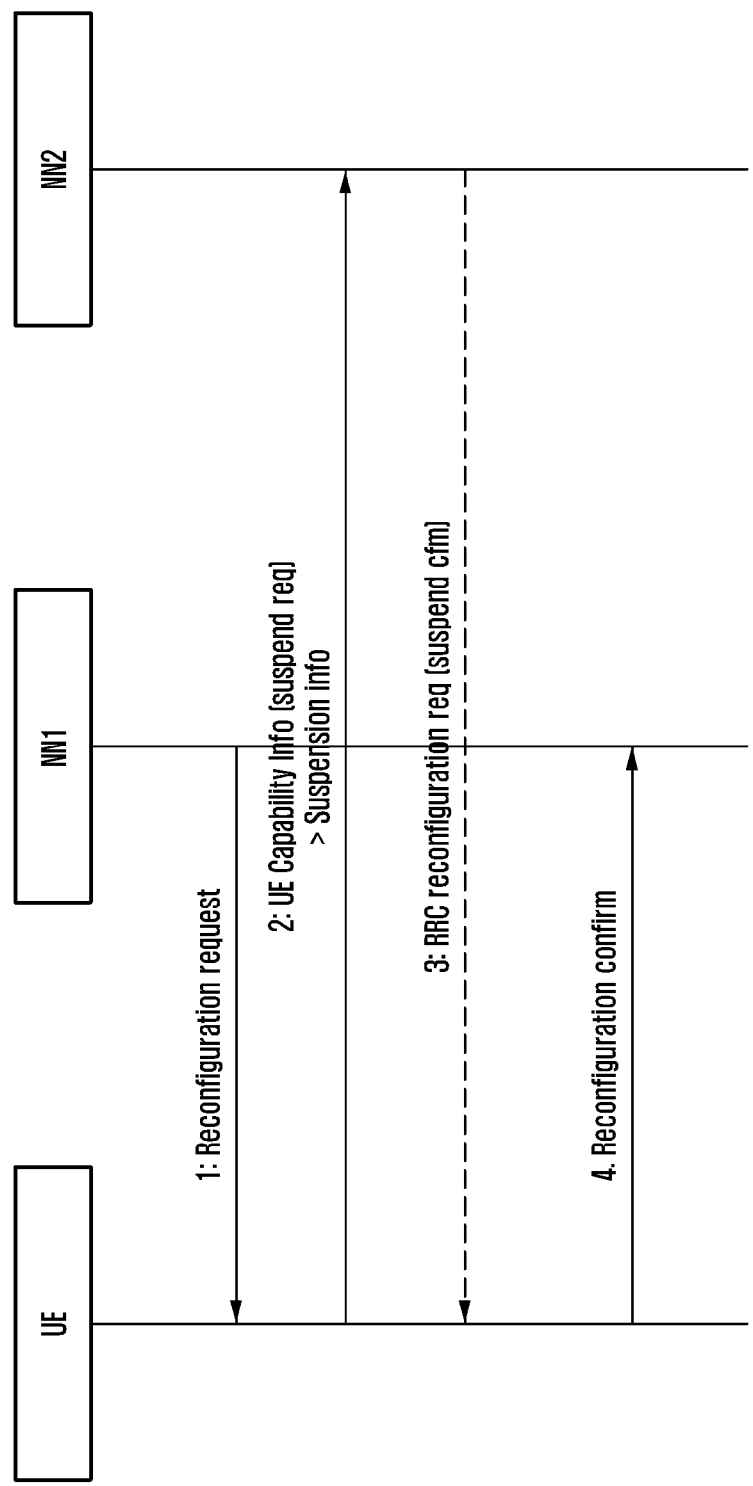
[Fig. 25]

[Fig. 26]
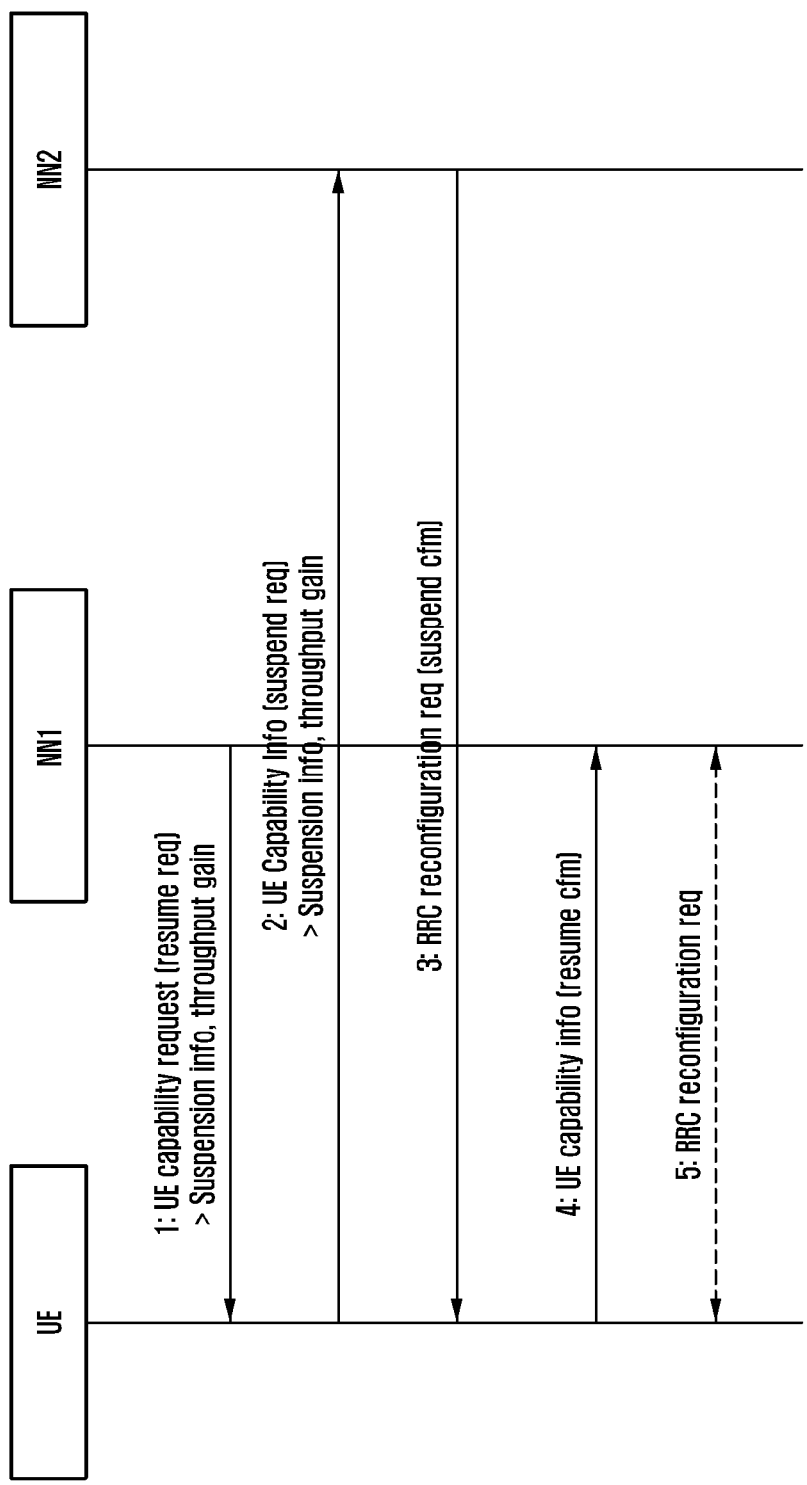

[Fig. 27]
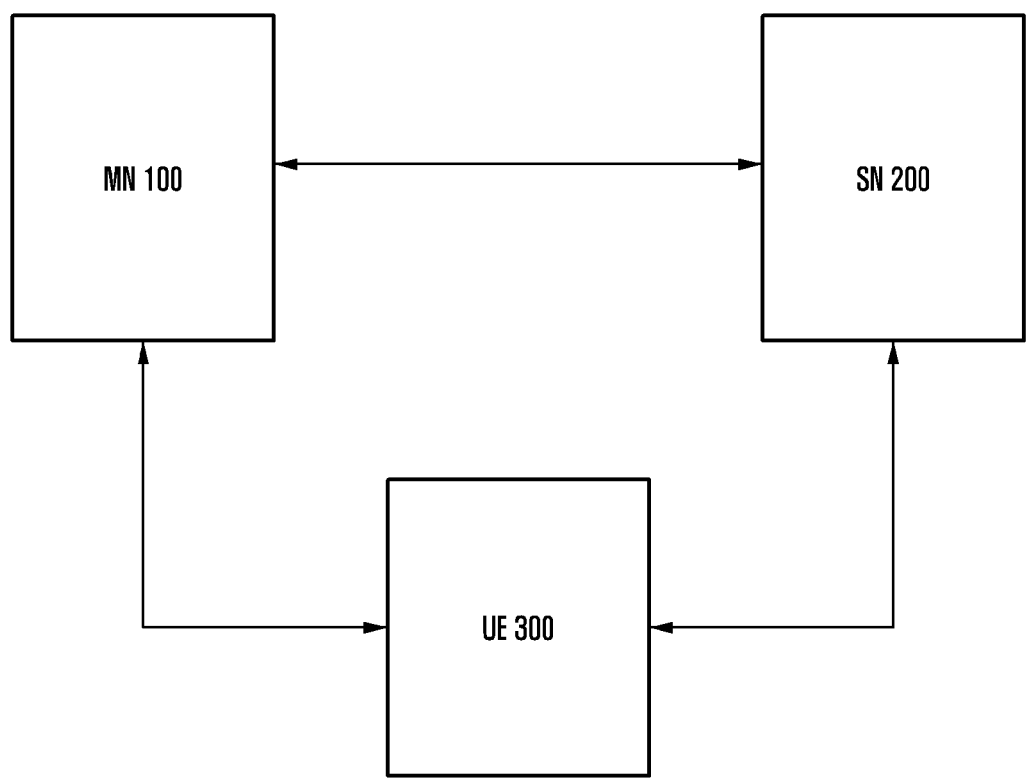

NETWORK INTERCONNECTIVITY

TECHNICAL FIELD

The present invention relates to interconnectivity between different communication networks. It particularly, but not exclusively, relates to dual connectivity in communication networks where one network is LTE and the other is Fifth Generation (5G).

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In prior art LTE configurations employing dual connectivity (DC) Release 12 of the 3GPP standard specification, DC between two different LTE eNBs is standardised. However, in future releases, it will be possible to offer DC between an LTE network and a 5G network as well as between two or more 5G nodes. The 5G network in particular concerns a new radio access technology (RAT), that may include functionality unknown to the LTE network.

In particular, if a User Equipment UE supports LTE and 5G, then it is important that its radio connections are properly configured. For example, it may be that the radio hardware in the UE cannot fully support LTE and 5G simultaneously, meaning the network is unable to apply LTE and 5G configuration options independently but have to choose between a limited set of combinations supported by the UE. For example, some of the UE memory may be shared between the LTE and 5G connections, or it may not be possible to configure an LTE carrier on a particular frequency band while at the same time the UE is configured with a New Radio (NR) carrier on another particular frequency. Note that throughout this specification, the terms NR (New Radio) and 5G (Fifth Generation) are used interchangeably and are intended to refer to the same standardised system.

For example, if a first node, the Master Node, MN, employs the LTE RAT and a second node, the Secondary Node, SN, employs the 5G RAT, then it is possible that the nodes cannot mutually understand each other's configurations. Similarly, an LTE MN may not comprehend the UE 5G capabilities. In order to ensure that the UE is not configured beyond its capabilities, co-ordination is required between the nodes involved in DC. Embodiments of the present invention are arranged to facilitate this coordination, moreover in a manner to achieve optimal performance. It is noted that most details of the 5G configuration and 5G UE capabilities are not relevant for this UE capability coordination and hence it is preferable that an LTE MN is not required to comprehend such information.

In broad terms, an objective of embodiments of the present invention is to coordinate different Radio Access Technologies (RAT), not only to ensure the UE is not configured beyond its capabilities but furthermore to maximise system performance. In particular, this should take account of future, perhaps currently unknown, features.

DISCLOSURE OF INVENTION

Technical Problem

Embodiments of the invention seek to negotiate alternative configuration options in case there are dependencies in UE capabilities between the two different networks, in particular an LTE and a 5G network.

Broadly, embodiments of the invention seek to configure network configurations to maximise network throughput on the basis of configuring LTE and 5G connections for a particular UE operating in a DC scenario.

It may not be possible in any particular case to configure the UE to maximise throughput for both the LTE and the 5G connection and, if so, a compromise position will be adopted, which depends on the particular circumstances prevailing.

Throughout this specification, the terms MN and SN refer to Master Node and Secondary Node respectively. These correspond to MeNB and SeNB as used in LTE systems or MgNB and SgNB as used in 5G systems. MCG and SCG refer to Master Cell Group and Secondary Cell Group respectively, also as used in LTE. Inter-node procedures/messages: SN addition/modification/release is a generalised term corresponding to SeNB addition (request, request ack), SeNB modification request and so on as used in LTE or SgNB addition and SgNB modification and son on as used in 5G.

When there is Dual Connectivity in use, there are 4 possible deployment options:

TABLE 1

| MN | SN |
|---|---|
| LTE | LTE |
| LTE | NR |
| NR | NR |
| NR | LTE |

Note that the MN manages the MCG and the SN manages the SCG.

Generally, it is desirable to provide flexibility in terms of support of several functions dependent on band, band combination or even band of band combination (i.e. capability signalling is complex). Further, it is also generally desirable to share device capabilities e.g. transmit power, memory, processing (as in case of DC).

In general, the network always attempts to respect the capabilities of the UE, i.e. the network does not try to instruct the UE to operate in a manner in which it cannot and the UE will reject commands which go beyond its capabilities.

In the case of LTE DC, the features that the UE can support for SCG is impacted by what is configured for MCG (and vice versa) i.e. the two nodes need to share UE capabilities. A primary case concerns bands/band combinations. There may be limitations or difficulties in attempting to support simultaneous configuration of cells in the same or similar frequency range (i.e. from radio perspective or when they share RF hardware)

In the case of LTE DC, there is tight coordination between the nodes to avoid any conflicts Only the MN initiates addition of Secondary Cells, so the MN can ensure limitations regarding bands/band combinations. For several high level parameters, explicit signalling is used by which the MN can restrict what the SN can configure e.g. memory, transmit power, TB size in TTI. More detailed capability coordination is by implicit signalling i.e. MN provides the MCG configuration, from which SN can determine more detailed restrictions (i.e. detailed leftovers). The SN needs to comprehend MCG configuration to derive these detailed limitations/leftovers.

In case of LTE DC, it is assumed that the MN still has overall responsible for ensuring that UE capabilities are respected. The configuration set by the SN is transferred via the MN to the UE. Forwarding is not entirely transparent i.e. the MN is required to comprehend the SCG configuration (and hence can verify if UE capabilities are respected).

FIG. 1 shows a message exchange between the three entities involved in a DC configuration: the UE, the MN and the SN. The messages are labelled 1 to 5 and are as follows:
  1. The MN retrieves UE capabilities from the UE.
  2. Typically a measurement report from the UE triggers configuration of DC (i.e. the cell is good enough to be configured by SN)
  3. The MN requests the SN to configure DC. Besides the main configuration aspects decided by the MN (DRBs, SCells), the MN signals parameters for capability coordination i.e. UE capabilities and MCG configuration, as well as some specific parameters (power coordination, TB-bits)
  4. The SN signals the SCG configuration, that it selected based on the inputs provided by the MN, to the MN
  5. The MN forwards the SCG configuration to UE. The MN may simultaneously adjust the MCG configuration, which may be needed to respect UE capabilities Solution to Problem In general, embodiments of the invention provide: selection of an optimal configuration while respecting UE capabilities; support for some level of UE capability sharing/dependencies (i.e. conflicts), while network nodes have maximal independence and require minimal inter-RAT knowledge such as configuration and capabilities.

According to the present invention there is provided an apparatus and method as set forth in the appended claims. Other features of the invention will be apparent from the dependent claims, and the description which follows.

According to a first aspect of the present invention, there is provided a method of operating a telecommunication system operating in a multi-connectivity configuration, wherein a first node operates a first radio connection using a first Radio Access Technology, RAT, and a second node operates a second radio connection using a second RAT, wherein a User Equipment, UE, operable to communicate over first and second radio connections, is configured on the basis of its capabilities with respect to the first node and its capabilities with respect to the second node.

In an embodiment, the UE reports to the first node how its capabilities with respect to the first node are related to its capabilities with respect to the second node and support of a particular capability with respect to the first node is dependent on use of the particular capability with respect to the second node.

In an embodiment, the UE reports to the first node a subset of possible capabilities with respect to the second node.

In an embodiment, the subset of possible capabilities is in a format which is comprehensible by the first and second node.

In an embodiment, the first and second node communicate regarding the configuration of the UE, via a backhaul connection.

In an embodiment, the first and second node communicate regarding the configuration of the UE, via the UE.

In an embodiment, the UE indicates a shared resource to the first node, the first node indicates to the UE how much of the shared resource is to be allocated to the second node and the second node requests a different allocation if required.

In an embodiment, the shared resource may be a shared buffer or a baseband processing capability.

In an embodiment, the first node negotiates the UE configuration with the second node on the basis of maximising a selected parameter. Preferably, the selected parameter is data throughput. Preferably, the data throughput is weighted by one or more of UE cost and system cost.

In an embodiment, the first node indicates to the second node configuration restrictions regarding the second radio connection related to the UE capability dependencies, whereby the indication of the configuration restriction concerns a subset of the radio configuration or refers to an option in the UE capabilities indicating what the UE may or may not support in the form of an index. The index, in this context, is a means to indicate which bands or BCs the SN can or cannot configure. Furthermore, the information regarding what the index refers to is included in LTE capabilities (i.e. as used by MN to decide when setting the index) and possibly in NR capabilities (as used by SN when interpreting the index).

In an embodiment, one of the first node and second nodes is operable according to an LTE standard and the other of the first and second nodes is operable to a 5G standard.

In an embodiment, a plurality of second nodes is provided. For example, there may be a single master node and plurality of secondary nodes.

In an embodiment, if the first node negotiates a configuration option comprising a particular combination of a first radio connection configuration option and a second radio connection configuration option, then the second node indicates a different configuration option, if required.

According to a second aspect of the present invention, there is provided a telecommunication system comprising a first node, a second node and a UE, all operable according to the first aspect.

According to a third aspect, there is provided a network node operable according to the first aspect.

According to a fourth aspect, there is provided a User Equipment operable according to the first aspect.

According to a fifth aspect, there is provided method of operating a telecommunication system operating in a multi-connectivity configuration, wherein a master node operates a first radio connection to a UE using a first Radio Access Technology, RAT, and a secondary node operates a second radio connection to the UE using a second RAT, wherein the master node decides configuration restrictions to be applied by the secondary node in connection with the second radio connection to the UE.

Advantageous Effects of Invention

In embodiments of the present invention, the Issue of dependency is same i.e. the UE LTE capabilities are likely to be impacted by certain conflicting 5G configurations. A primary case concerns bands/band combinations in the same/similar frequency range, as these may not be possible to configure simultaneously from the radio perspective or when they share RF hardware. Furthermore, UE providers typically prefer to share other device capabilities such as, transmit power, memory, processing.

For the case of IRAT DC, there are some differences from the prior art discussed above. It is generally desirable is that the network nodes involved should be able to set the configuration of its RAT as independently as possible, i.e. without reference to the other nodes. The 5G node should decide which cells to configure, based on measurements it configures the UE to perform, rather than the MN initiating SCG cell addition. Additionally, nodes should not be required to comprehend each others configuration (as in the prior art LTE DC). Similarly, nodes should not be required to fully comprehend UE capabilities concerning another RAT.

BRIEF DESCRIPTION OF DRAWINGS

FIG. 1 shows a prior art message exchange in a DC configuration;

FIG. 2 shows a message exchange according to an embodiment of the present invention;

FIG. 3 shows a message exchange according to an embodiment of the present invention;

FIG. 4 shows a message exchange according to an embodiment of the present invention;

FIG. 5 shows a message exchange according to an embodiment of the present invention;

FIG. 6 shows a message exchange according to an embodiment of the present invention;

FIG. 7 shows a message exchange according to an embodiment of the present invention;

FIG. 8 shows a message exchange according to an embodiment of the present invention;

FIG. 9 shows a message exchange according to an embodiment of the present invention;

FIG. 10 shows a message exchange according to an embodiment of the present invention;

FIG. 11 shows a message exchange according to an embodiment of the present invention;

FIG. 12 shows a message exchange according to an embodiment of the present invention;

FIG. 13 shows a table related to FIG. 12;

FIG. 14 shows a message exchange according to an embodiment of the present invention;

FIG. 15 shows a message exchange according to an embodiment of the present invention;

FIG. 16 shows a message exchange according to an embodiment of the present invention;

FIG. 17 shows a table illustrating conflicting configurations;

FIG. 18 shows a table illustrating a selection in the case of 1 conflict;

FIG. 19 shows a table illustrating a selection in the case of 2 conflicts;

FIG. 20 shows a table illustrating a continuous selection scheme;

FIG. 21 shows a message exchange according to an embodiment of the present invention;

FIG. 22 shows a message exchange according to an embodiment of the present invention;

FIG. 23 shows a message exchange according to an embodiment of the present invention;

FIG. 24 shows a message exchange according to an embodiment of the present invention;

FIG. 25 shows a message exchange according to an embodiment of the present invention;

FIG. 26 shows a message exchange according to an embodiment of the present invention; and FIG. 27 shows a general network schematic according to an embodiment of the present invention.

MODE FOR THE INVENTION

Embodiments of the present invention provide an optimal configuration in cases of UE capability sharing/dependencies (i.e. conflicts). In one example, this can relate to bands or band combinations, but other scenarios exist too.

In one embodiment, the network nodes detect dependencies/conflicts. The UE informs LTE network (eNB) within LTE capabilities how its LTE capabilities are impacted by conflicting 5G configurations. Likewise 5G radio network is informed within 5G UE capabilities. The Impact of conflicting 5G configuration could be: non-support, reduced support (e.g. lower value/performance).

In another embodiment, the MN decides either by setting minimum criterion or relies on assistance from secondary node. The decision may primarily be based on achievable data throughput, as a measure of performance. This may be weighted by system cost (e.g. required network resources) and/or UE cost (e.g. battery consumption). Other aspects may also be considered e.g. if service that a UE wants to receive is provided on limited carriers i.e. a throughput-based decision may be limited to equal carriers.

In another embodiment, nodes are aware of the configuration supported by each other (e.g. bands/carriers). Options regarding roles of master/secondary node include: only MN initiates the setup of conflicting configurations; and both nodes may initiate setup of conflicting configurations.

FIG. 2 shows a message exchange depicting network awareness of UE capability sharing/dependencies. The issue addressed here concerns how the network becomes aware that UE capabilities are shared between LTE (MN) and NR (SN). In other words how does it know that there are dependencies and, hence, it needs to decide/select between conflicting configuration options.

In the embodiment of FIG. 2, the UE informs LTE network (eNB), in message 2, within LTE capabilities how its LTE capabilities are impacted by conflicting 5G configurations. Likewise the 5G radio network is informed within 5G UE capabilities. The impact of conflicting 5G configuration could be: non-support, reduced support (e.g. lower value/performance). This conforms to the general principle that a network node should not be required to investigate other RATs capabilities/signalling.

FIGS. 3 to 5 concern an MN-initiated SCG modification e.g. addition of one or more SCells. For instance, when requesting the SN to add SCell(s) for which the MN will have to limit the MCG configuration (i.e. a 'conflicting config'), the MN provides a minimum criterion. If the SCG can meet this, it will simply configure such SCell(s). If not, it will not configure but will return a failure message with an achievable criterion, FIG. 3 shows a message exchange depicting a general mechanism for coordination between nodes. The issue addressed here is how do the network nodes coordinate their configurations in case there are UE capability dependencies and, hence, there is a need to decide or select between conflicting configurations. FIG. 3 illustrates, in a general form, the high level interaction.

In the embodiment of FIG. 3, the Master acts in one of two ways, depicted in the left hand and right hand part of FIG. 3, respectively:

A) by setting minimum criterion (left side of FIG. 3) i.e. MN delegated: the MN delegates the actual check to the SN) i.e. the SN performs the evaluation of the criterion and if not met, the SN will initiate release of the conflicting configuration; or B) based on assistance from the secondary node (right side of FIG. 3) i.e. MN based: the MN performs the actual check based on assistance SN i.e. the MN merely asks the SN to report and it is the MN that decides whether to initiate release or not.

The decision may be primarily based on achievable data throughput. It may be weighted by system cost (e.g. required resources) and/or UE cost (e.g. battery consumption). Other aspects may also be considered e.g. if service a UE wants to receive is provided on limited carriers i.e. a throughput-based decision may be limited to equal carriers.

In general, nodes are aware of the configuration supported by each other (e.g. bands/carriers). There are various options regarding the role of the SN with respect to conflicting configurations:

a) Only the MN initiates setup of conflicting configurations b) Both nodes may initiate setup of conflicting configurations c) Whether the SN may initiate setup of conflicting configurations could either be fixed in standards, or configured by the MN SN initiated modification could be performed in 1 or 2 steps:

1 step: SN modification request may be confirmed immediately (e.g. in case an achievable condition is met)

2 step: a sequence with an MN initiated procedure nested in the middle of the SN initiated procedure may be used in specific cases For the handling of conflicting configurations, the Table 2 below summarizes elementary procedures and their use:

TABLE 2

| Initiate conflicting configuration | Notes |
| --- | --- |
| Master initiated SCG modification | Always used but in case the MN performs actual check of criterion, the changes, compared to the procedures used in LTE DC, may be limited (i.e. to triggering conditions and possibly to indication of configurations that can/cannot be initiated by the SN) |
| Secondary node initiated SCG modification | Used only if the SN is allowed to initiate modification of conflicting configurations One or two step variants, as set out above |
| Assistance procedure | Used only if the MN performs the actual check of criterion based on assistance from the SN |

FIG. 4 shows a message exchange in connection with an MN initiated reconfiguration. The messages exchanged are numbered and 1 and 2:

1: SCG or SN modification request

The MN may indicate configurations that are or are not allowed to be initiated by the SN (SCG establishment/modification). When requesting the SN to add one or more conflicting configurations, the MN may indicate a minimum criterion to be met for each configuration (MN delegates evaluation)

2: SCG or SN modification request acknowledgment (ack)

The SN may indicate an achievable criterion to be met for each one or more conflicting configurations for which the MN has indicated a minimum e.g. when it has almost achieved the minimum value (MN delegates evaluation)

It is instructive to consider an example of a conflict. Consider an LTE band or Band Combination (BC) that the UE only supports if certain 5G band or BC, supported by the UE, is not configured alongside. The minimum criterion may be defined as minimum average achievable throughput.

The same sequence applies for SCG establishment i.e. SN addition request/request ack. Also note that the messages shown include other parameters (not listed for clarity purposes).

FIG. 5 illustrates a message exchange in the case of SN assistance. The messages labelled 1 and 2 are in addition to those shown in FIG. 4:

1: SCG or SN assistance request

The MN may indicate configurations for which it wants the SN to provide some assistance information. The MN may include some configuration parameters e.g. regarding what information the SN should measure, what to report and when to trigger a report (e.g. periodical or when a certain event condition is fulfilled)

2: SCG or SN assistance

The SN reports the requested information for one or more of the configurations for which the MN requested it to provide assistance. For example, it should periodically report the achievable throughput for a particular 5G band or BC.

The embodiments of FIGS. 4 and 5 concern a case in which there is no upfront bare minimum criterion. In such a case the SN, within the modification request, indicates an achievable criterion. Based on this, the MN decides whether to accept or reject the request. When accepting, it sets a minimum criterion, which indicates that the SN should release when this cannot be met anymore.

FIG. 6 illustrates a message exchange in relation to a 1 step SN initiated reconfiguration. The messages are labelled 1 and 2:

1: SCG or SN modification required

When requesting the MN to add one or more conflicting configurations, the SN indicates an achievable criterion.

2: SCG or SN modification confirm

The MN indicates a minimum criterion to be met for each one or more of the conflicting configurations that the SN has requested to add. The MN also confirms establishment of the conflicting configurations that the SN requested to add. This confirmation may be implicit.

Consider an LTE band or Band Combination (BC) that the UE only supports if certain 5G band or BC, supported by the UE, is not configured alongside. The minimum criterion may be defined as minimum average achievable throughput.

FIG. 7 illustrates a message exchange in relation to a 2 step SN initiated reconfiguration. The messages are labelled 1 and 2:

1: SCG or SN modification required

When requesting the MN to add one or more conflicting configurations, the SN indicates an achievable criterion (as per FIG. 6)

The MN initiates MN-initiated SCG modification. As part of this procedure, the MN indicates a minimum criterion to be met for each one or more of the conflicting configurations that the SN requested to add.

2: SCG or SN modification confirm

The MN confirms establishment of the conflicting configurations that the SN requested to add, possibly by absence (i.e. when only indicating the configurations which modification failed)

Consider an LTE band or Band Combination (BC) that the UE only supports if certain 5G band or BC, supported by the UE, is not configured alongside. The minimum criterion may be defined as minimum average achievable throughput.

For each LTE band or BC, consideration is given to the impact of configuring a dependent 5G band or BC. Signalling herein is illustrated for the simplest case i.e. impact of configuring 5G band or BC is that LTE band or BC becomes non-supported. Absence of the impact info implies that the concerned LTE capability is not affected by 5G i.e. there are no dependencies.

Note that another option according to an embodiment of the present invention is more generally reduced support rather than non-support.

RF parameters referred to in messages (i.e. indicating how UE LTE capabilities are affected by 5G) may include:

List of conflicting 5G bands i.e. a list separate from the list of supported bands within IRAT-Parameters may be indicated (particularly useful in case only a few of the 5G bands conflict with LTE bands or band combinations)

List of conflicting 5G band combinations

Supported LTE bands (as in supportedBandListEUTRA), which is a list of supported bands, and for each indication of functionality which support is band specific, and for each:

List of conflicting 5G bands is, for example, a BIT STRING with a first bit referring to a 1st conflicting 5G band either indicated in a list of supported bands within IRAT-Parameters (or, by a separate list of conflicting bands as described above).

List of conflicting 5G BCs is for example, a BIT STRING with a first bit referring to a 1st BC in a list of conflicting 5G band combinations.

Supported LTE band combinations (as in supportedBand-Combination(Reduced)) is a list of supported BCs, and for each LTE BC (same as for each LTE band):

a list of conflicting 5G bands; and a list of conflicting 5G BCs.

In certain cases, the IRAT parameters may include a list of supported 5G band combinations e.g. in case of a UE may be connected to an LTE MN and more than one 5G MN. If the IRAT parameters include such list, the conflicting 5G band combinations may or may not be indicated separately (alike for conflicting 5G bands).

In the embodiments described so far, each node detects capability dependencies by itself, based on its own capabilities. This is achieved by including information about dependencies or conflicting other aggregated RAT configuration inside the UE capabilities. While this approach works, there are further improvements which are possible and which are described in the following embodiments.

In particular, it can be difficult to indicate the dependencies at a suitable detailed level. Also, there can be some duplication of the information if, for example, the same information appears in the capabilities of each aggregated RAT.

In an embodiment, there is a general preference that nodes should not be required to comprehend the configuration of the other cell group which uses a different RAT e.g. the LTE node should not be required to understand the configuration of the related 5G node.

One means of addressing this is to introduce a common part of a message which is understood by the nodes of both types of RAT. This may be done as part of the MCG/SCG radio configuration. However, embodiments of the present invention introduce common UE capabilities which are also exchanged over radio interfaces.

Embodiments of the invention introduce a UE capability information container covering parameters concerning the case of aggregation with more than one RAT involved. The relevant UE capabilities are signalled independently. The relevant UE capabilities may be used for parameters relevant for (and requiring comprehension by) nodes of each involved RAT.

For example, in case of LTE-5G DC, the common UE capability container would cover capabilities to be comprehended by LTE and 5G nodes, typically used for dependent LTE-5G UE capabilities. In such an approach, a network node only needs to comprehend the UE capabilities of the other RAT that are included in this common container. I.e. other capabilities that are contained in the LTE and 5G capability containers only need to be comprehended by the network node of the concerned RAT.

For example, in case of LTE-5G DC, the common UE capability container may cover the band combinations comprising LTE and 5G bands. Related to this, it is noted that currently there is a lot of flexibility regarding UE capabilities e.g. the support of a certain parameter may be specific to a band, a band combination or even to a band of a band combination entry. When using a common capability, it appears straightforward to support such flexibility also for band combinations comprising LTE and 5G bands As indicated previously, the LTE DC based approach for UE capability coordination approach would require the network nodes to fully comprehend UE capabilities and configurations corresponding to the other RAT, which embodiments of the invention aim to avoid or minimise. The concept of separating or grouping the part that is to be comprehended from the part that need not be comprehended can also be used for the relevant radio configurations. In other words, a separate common field configuration may be used also. A further step, requiring even less comprehension, is to use an index as described later.

FIG. 8 shows a message exchange relating to the transfer of capability information from the UE to the MN. There are 3 messages labelled 1 to 3:

1: The MN requests the UE to provide the capabilities of any RAT combinations for which it may configure aggregation i.e. IRAT DC capabilities (the common capabilities).

2: The UE provides the requested capabilities to the MN. The capability information is used by the eNB to detect any dependencies or conflicts regarding the UE support of the configurations of the aggregated RATs (as in the previous embodiments).

3: The MN forwards the received IRAT DC capabilities relevant for the SN i.e. combinations including the RAT of the SN.

The SN may also retrieve the IRAT DC capabilities from the UE i.e. when the option of signalling via the direct interface is available i.e. directly between the UE and SN, rather than via the MN.

The MN and the SN use the IRAT DC capabilities to determine any (potential) capability dependencies or conflicts.

If at least partial comprehension of IRAT DC configuration is supported, the information could also be used for UE capability dependency or conflict resolution i.e. when a scheme more like LTE DC is used, rather than the one described in previously described embodiments.

FIG. 9 shows an alternative message exchange related to transfer of capability information. There are 2 messages, labelled 1 and 2. With respect to comprehension of the radio configuration information, this scheme is more similar to LTE DC.

In this embodiment, the MN and the SN again use the IRAT DC capabilities (i.e. common UE capability container) to determine any (potential) capability dependencies or conflicts. The SN determines what it can still configure for the SCG based on IRAT DC UE capabilities and on (part of the) MCG configuration. This requires the NR SN to comprehend (part of) the LTE MCG configuration.

In this scheme, the MN is also assumed to comprehend the SCG configuration, as it needs to know for which MCG reconfigurations it also needs to invoke a reconfiguration of the SCG.

The part that needs to be comprehended concerns the conflicting or dependent configurations e.g. concerning LTE bands or band combinations that the UE cannot handle alongside certain NR bands or band combinations.

To facilitate comprehension, the part that needs to be comprehended by the other RAT node may be signalled by a separate field i.e. to limit the amount of other RAT information related configuration to be comprehended.

The embodiment shown in FIG. 9 shows the case of an SN initiated SCG reconfiguration, but it is understood that this is just one example.

The messages exchanged are:

1: The SN initiates a modification of the SCG configuration towards the MN.

The SN provides the SCG configuration that it intends to configure. The SN may only initiate SCG configuration changes that do not require MCG configuration changes i.e. those which are possible with the UE capabilities remaining, given the current MCG configuration.

The MN evaluates the SCG reconfiguration and initiates an RRC connection reconfiguration towards the UE. In case the SCG reconfiguration is not possible with the UE capabilities remaining, given the current MCG configuration, the MN may initiate MCG reconfiguration. This would be included in the same Uu message as an SCG reconfiguration, with joint success or failure.

2: The MN confirms the SCG reconfiguration.

The MN confirms the reconfiguration and may include the MCG configuration, possibly only if it has changed.

FIG. 10 illustrates a message exchange related to an upfront configuration of a bare minimum criterion. There are 2 messages identified.

Upon configuring IRAT DC, the MN provides the minimum criterion for all conflicting configurations (that the SN may initiate) i.e. an upfront criterion.

An aim of this approach is to suppress SN-initiated requests that will never be accepted by the MN i.e. the SN only initiates the conflicting criterion when it can meet the upfront minimum criterion. In other words, the upfront criterion may concern a more general bare minimum which could be signalled or fixed in some way e.g. by OAM. Note that the MN may set the value of the minimum criterion depending on the actual MCG settings.

1: The MN initiates establishment of the SCG/SN

MN configures an upfront or bare minimum criterion for each potential conflicting criterion.

2: The SN acknowledges successful establishment of the SCG/SN

Whenever detecting the need for an SN-initiated modification involving capability conflicts, the SN verifies if the upfront or bare minimum criterion is met. Only if this is the case, will the SN request the SN modification resulting in the concerned conflicting configuration.

FIG. 11 relates to a message exchange related to L2 buffer size coordination. It has been proposed that Buffer sharing should be supported, with a preferred solution involving a semi-static split. One possible approach is that the MN assigns a percentage e.g. that SN may use up to 75% of the UE's total L2 buffer size for NR, i.e. the remaining 25% would then be available for MN/LTE radio connection.

It is at present unclear how the nodes may interact precisely in practice and, in particular, how to negotiate the split. In this respect it should be noted that for the LTE MN may be difficult to predict the system benefit when allocating a larger share to the 5G SN as this may require detailed knowledge of 5G. This, in particular, applies when negotiating about conflicting bands or band combinations, for which the achievable throughput may depend on detailed UE and SN capabilities. A negotiation procedure is disclosed by which it is possible to avoid such detailed knowledge about another RAT i.e. by exchanging a simple parameter e.g. achievable throughput.

In order for the nodes to interact or negotiate, it is possible to use an X2 based procedure i.e. to align with coordination of other aspects. Here, the MN decides and signals the L2 buffer size to be used for NR (e.g. a percentage). When the SN wants more, it indicates the requested L2 buffer share and some assistance e.g. the corresponding achievable throughput gain. This involves the exchange of simple parameters across X2 to avoid awareness of other the RAT's configuration.

Initially, i.e. upon SCG establishment, the MN merely sets a value while not yet having SN assistance.

The UE indicates the total L2 buffer size to MN by extending the existing LTE capability field with new or larger values. When IRAT DC is not configured, the entire memory available for L2 buffers may be used for LTE.

Alternatively, a new field may be introduced e.g. to include values beyond what is sensible to use in LTE.

FIG. 12 shows a message exchange in connection with baseband processing coordination.

In LTE, UE capabilities concerning baseband processing related functions (e.g. MIMO layers, simultaneously configurable carriers, CSI processes, NAICS resources) are specified per supported band combination. It has been acknowledged that to avoid excessive signalling, it is desirable to pull such baseband related capabilities out of the supported band combinations i.e. by specifying baseband processing capabilities separate from RF related capabilities. In particular when this is done, it may be possible for the MN to semi-statically allocate a split ratio e.g. indicate that SN can use 70% of the UE's general purpose baseband processing. It has been agreed that the LTE MeNB should not be required to comprehend the SCG configuration and, generally, it is desirable to avoid awareness of the NR SCG configuration details. However, some limited awareness appears acceptable and may be unavoidable.

In order for the nodes to interact or negotiate, it is possible to use an X2 based procedure i.e. to align with coordination of other aspects. Here, the MN decides and signals the baseband processing share to be used by the SN for 5G (e.g. a percentage). When the SN wants more, it indicates the requested baseband processing share and some assistance e.g. the corresponding achievable throughput gain.

Potential options for the desired baseband processing include: baseband processing level, total configured bandwidth, and total achievable throughput.

Simple parameters are exchanged across X2 to avoid awareness of other RAT configuration. Initially, i.e. upon SCG establishment, the MN merely sets a value while not yet having SN assistance.

Within LTE capabilities, the UE indicates how specific capabilities are affected by reduced baseband processing. For example, the value of an LTE capability may decrease with 10 for every increase of 50 Mbps in NR throughput. This is illustrated in the table of FIG. 13 which shows some example figures for the above scheme.

Within the configuration, the MN indicates the baseband processing share available for each RAT.

FIG. 14 shows a message exchange in connection with a negotiation procedure.

The MN and the SN are aware of conflicting configurations from their native capabilities (left hand figure). The SN provides assistance information about (potentially) conflicting SCG configuration (Achievable Throughput, AT). The MN sets requirement for conflicting SCG configuration (Required Throughput, RT). The SN continuously evaluates the RT set by MN.

Continuous evaluation of the criterion (e.g. throughput) is not deemed necessary and a one shot operation is preferable. However, continuous evaluation may be used if desired in a particular scenario.

For any cell used by the MN as an SCG cell, the SN continuously informs the MN about significant load changes which are non UE-specific. This is supported by X2 presently.

It is possible to predict, based on cell load, how throughput evolves for a given configuration. However, throughput may suddenly drop when overload affects network's abilities e.g. MIMO layers. Achievable throughput is UE specific i.e. it depend on the capabilities of a specific UE.

An alternative embodiment provides a signalling throughput value per conflict. There is no partial success or failure. The reconfiguration initiator may avoid troublesome reconfigurations cases by, including specific multiple conflicts combinations.

Signalling multiple throughput values is advantageous. With a single throughput value, a reconfiguration involving 2 independent conflicts may succeed even if one of the conflicting reconfigurations may actually result in throughput degradation, i.e. when it is more than compensated for by the other conflicting reconfiguration. Multiple values facilitate informing the peer about what failed, enabling avoidance of same issue when retrying, thereby saving time and resources.

Consider the case where the MN initiates a conflicting reconfiguration, for example the addition of a 4G cell requiring the release of a 5G cell. Within the request, the MN indicates the throughput gain (delta) it can achieve with the conflicting MCG reconfiguration. The SN rejects the reconfiguration if the throughput loss (delta) involved with the SCG reconfiguration needed to facilitate the MCG reconfiguration exceeds the throughput gain indicated by MN. i.e. it rejects if the 5G cell to be released would result in more throughput than the 4G cell that the MN wishes to add. The MN may avoid reconfigurations that are likely to fail e.g. by estimating, amongst other factors, the associated SCG reconfiguration loss based on Xn load information.

Consider the case of SeNB-initiated conflicting reconfiguration, for example, the addition of a 5G cell requiring the release of a 4G cell. Within the request, the SN indicates the throughput gain (delta) it can achieve with the conflicting SCG reconfiguration. The MN rejects the reconfiguration if the throughput loss (delta) involved with the MCG reconfiguration needed to facilitate the SCG reconfiguration exceeds the throughput gain indicated by SN. The SN never stops itself from requesting potentially conflicting configurations. The MN does not signal RT unless there is an actual conflict, as the RT value may only be used at a particular moment in time.

Certain configuration information needs to be exchanged between the nodes. If the SN provides information upon initiating any potential conflict, the MN could provide it only upon initiating actual conflicts. However a preferred option is to require that the node initiating the potential conflict provides information to its peer. Other configuration information need not be exchanged e.g. regarding cells not involved in any conflict.

When it is necessary to indicate conflicts, it is important to ensure that the nodes understand the communications, which means that a common language or protocol is required.

One approach is to use the DC model i.e. initiator indicates its proposed configuration: e.g. the MN indicates the 4G bands conflicting with 5G bands that may be configured.

Another approach is the HO model i.e. the source adjusts to the target: e.g. MN indicates conflicting 5G bands.

The DC model involves somewhat more work for receiver as it still needs to process UE capabilities to determine the conflicting configuration.

The signalling overhead appears insignificant, with no clear and significant differences between the two approaches. For instance, one source configuration might conflict with multiple target configurations, or multiple source configurations could conflict with the same one target configuration.

In an embodiment of the invention, Indices might be used, referring to specific entries in UE capabilities. In case the LTE node indicates the conflicting NR band or BC, it need not really know the details (e.g. ARFCN) of the conflicting NR band or NR BC as it only needs a means to identify the conflicting NR band or BC across Xn. The same applies for the case where LTE MN indicates configured conflicting LTE band.

LTE capabilities will include:
List of conflicting NR bands e.g. 1: 5B1 (example)
List of conflicting NR BCs e.g. 1: 5B1+5B2 (5BC2), 2: 5BC1+5B2+5B3 (5BC5)

NR capabilities could either Include exactly same lists of conflicting LTE bands (e.g. 1: 4B2) & BCs (1: 4B1+4B2, 4BC1, 2: 4B2+4B3, 4BC5) or include conflicting bands in the same order at the start of a regular list of supported bands or BCs.

FIG. 15 illustrates a message exchange in connection with an MN-initiated reconfiguration. There are three messages indicated: 1, 2a, 2b.

1. SN Modification Request
The MN provides a list of any potential conflicts such as any that may require SCG re-configuration. The MN further indicates the acceptable throughput loss i.e. a single value, or one per potential conflict.

2a. SN Modification Request Ack
No information transferred i.e. no partial success 2b. SN Modification Reject
In case a throughput value is provided per conflict, the SN rejects only the conflict(s) which fails the throughput criterion. Otherwise, in the case of a single value, the MN either accepts or rejects all the (conflicting) configuration.

FIG. 16 illustrates a message exchange in connection with an SN-initiated reconfiguration. There are three messages indicated: 1, 2a, 2b.

1. SN Modification Required
The MN provides a list of any potential conflicts such as any that may require MCG re-configuration. The MN indicates the achievable throughput i.e. a single value, or one per potential conflict.

2a. SN Modification Confirm
No information transferred i.e. no partial success

2b. SN Modification Reject
In case a throughput value is provided per conflict, the SN might indicate the conflict which fails the throughput criterion.

Embodiments of the invention may implement continuous evaluation, as referenced previously. In particular action may be taken on not meeting the throughput conditions which are chosen. A preferred action is that the SN initiates a release of a conflicting configuration. This is simple to implement since no further throughput negotiation is required, but the MN should ensure that the RT is always up to date. Another possible action is that the SN reports a failure to meet the RT.

Further options are possible. These include:
a) The SN may initiate establishment of conflicting SCG configuration only if its AT exceeds the RT, if previously set by the MN.
b) The MN may initiate release of conflicting SCG configuration based on previously indicated AT.
c) At any time, the MN and SN may provide update values of RT and AT.
d) In case of a collision, the MN or SN may reject, based on the updated AT and RT values just provided.

FIG. 17 shows a table which illustrates an example of conflicting configurations, which may be used to evaluate embodiments which will be described shortly. Note that in the table, 4 refers to LTE, 5 refers to 5G, B refers to band, and BC refers to Band Combination.

Conflicting bands are 4B2-5B1.
Conflicting BCs are 4BC5-5BC2, 4BC1-5BC5.

To allow 5BC2, the MN can give up a cell on 4B2 or on 4B3. It would then set throughput criterion according to the amount it potentially sacrifices as a result.

In the case of a continuous evaluation scheme, according to some embodiments of the invention, the MN may adjust TR dynamically, depending on alternatives that are available.

FIG. 18 shows a table illustrating various options in a single conflict situation, by referring back to the table in FIG. 17.

The mechanism according to an embodiment of the invention enables the selection of the option which provides the highest throughput. In all case, the MN and SN are able to determine the throughput difference between the two options (option 1 and option 2).

In the first scenario, labelled 'choose', option 1 is to add an SCG cell on 5B1 and release an MCG cell on 4B2. Option 2 is to keep the MCG cell on 4B2 and not add an SCG cell on 5B1. 'Choose' indicates that a choice has to made between these 2 options. Choose indicates that a choice has to made between these 2 options. The comparison which is performed is to assess the gain of an SCG cell compared to the loss of an MCG cell.

In the second scenario, labelled 'divert', option 1 is to add an MCG cell on 4B2 and divert an SCG cell to 4B3. Option 2 is 'no change'. The comparison which is performed is to compare the gain of an MCG cell with the loss associated with the diversion of the SCG cell.

In the third scenario, labelled 'Divert with side effect', option 1 is to add an MCG cell on 4B2 and divert SCG cell 1 to 4B3 while reducing SCG cell 2 bandwidth, MIMO layers or #CSI processes. Option 2 is 'no change'. The comparison which is performed is to compare the gain of an MCG cell with the loss associated with diversion or modification of SCG cells.

The comparison is performed between the best options. In case a node has multiple alternatives for resolving the conflict, it only considers its best one. However, as the overall throughput picture is not considered, this scheme may result in somewhat sub-optimal result, when the overall throughput is considered.

FIG. 19 shows a table illustrating various options in a dual conflict situation, by referring back to the table in FIG. 17.

In the first scenario, labelled 'independent conflicts' which may include a scenario such as two independent choices of configuring Scell in LTE or NR (i.e. 2 sets of conflicting bands). Option 1 includes two sub-options:

1: Add SCG cell on 5B1 (and release MCG cell on 4B2)
2: Add SCG cell on 5Bm (and release MCG cell on 4Bn)

Option 2 includes two sub-options:

1: Keep MCG cell on 4B2 and not add SCG cell on 5B1
2: Keep MCG cell on 4Bn and not add SCG cell on 5Bm In this scenario, each conflict can be handled separately and separate signalling per conflict may be provided.

In the second scenario, labelled 'Dependent conflicts', which may include the case of adding 2 LTE cells, resulting in both conflicting band and BC (involving same band). In more detail, the MCG has cell on 4B2, SCG on 5B2. The SN wants to add cells on 5B1 and 5B3. Addition of SCG cell on 5B1 results in band conflicts (with 4B2). Addition of SCG cells on 5B1 and 5B3 additionally results in conflict with 4BC1.

Option 1 includes 2 sub-options, with the highest throughput first:

1: Add SCG cells on 5B1 & 5B3 and divert MCG cell from 4B2 to 4B3
2: Add SCG cell on 5B1 and divert MCG cell from 4B2 to 4B3

Option 2 includes two sub-options:

1: Only add SCG cell on 5B3 (and not modify MCG)
2: No change

For sub-option 1, the SN should report the additional throughput of adding both SCG cells (i.e. on 5B1 & 5B3). For sub-option 2, the SN should report the additional throughput of a cell on 5B1.

In the third scenario labelled 'Dependent conflicts' which may involve two diversions with related side effects and where the best alternative for the conflicts is not possible to configure together. Option 1 includes 2 sub-options:

1: Add MCG cell on 4B2 and divert SCG cell 1 to 4B3 while reducing SCG cell 2 MIMO layers
2: Add SCG cell on 5Bm divert SCG cell 1 to 4B3 while reducing SCG cell x MIMO layers In this case the SCG can choose its own preferred reconfiguration i.e. either initiate sub-option 1 or 2 within option 1. This may not result in higher overall throughput though.

With regard to the table in FIG. 19, for dependent conflicts, in case a node has multiple alternatives for resolving the conflict, it only considers its best one. Also, as the overall picture is not considered, this may result in a somewhat sub-optimal result.

Each side is able to determine if, from its perspective, the conflicts can be handled independently. The initiator only includes multiple conflicting reconfiguration if, from its perspective, they can be handled together. In case the receiving side cannot handle the multiple conflicts included in the requests, it only accepts part of them and rejects the others. It may accept requests resulting in highest throughput. Within the response, the receiver may indicate that the rejected requests may be retried immediately.

FIG. 20 shows a table setting how a continuous monitoring and selection scheme for dealing with conflicting configurations may be implemented. Four different events are described, along with details of the resulting configuration, common aspects, RT per conflict and a single value for Total Required Throughput, TRT.

The first event is an initial setup of IRAT BC of 4B1 and 5B1, which results in a configuration of 4B1+5B1. This requires a configured limit for 5B1, as it introduces a potential conflict as configurations including 4B2 cannot be configured in the future. As there is no alternative, a low value is set. The MN sets the RT for 5B1 to 5Mbos and the TRT to 5 Mbps.

The second event is that the UE provides a measurement report indicating the availability of a suitable cell on 4B2. There is no change in the resulting configuration. As there is now a real alternative configuration possible, the MN sets a more appropriate RT value of 20 Mbps for 5B1, giving a TRT of 20 Mbps.

The third request is that the SN requests an SC addition on 5BC2, indicating it can achieve 250 Mbps for this BC. The resulting configuration is 4B3+5B1+5B2. The MN configures an additional limit i.e. it sets a realistic RT for 5BC2 (5B1+5B2), as it inhibits configuration of the real alternative 4BC5. Note that the MN needs to change Pcell to BC3 and it should have a measurement configured for this. The MN sets RT for 5BC2 to 200 Mbps and the TRT becomes 220 Mbps.

The fourth event is that the rate that the MN can achieve for 5BC2 drops to below 200 Mbps. The resulting configuration is 4B1+5B1 and the SN initiates release of a cell on 5B2. The SN reports a failure and indicates AT per conflict of 25 Mbps for 5B1 and 200 Mbps for 5BC2. The MN correspondingly initiates release of a cell on 5B2.

Note that in embodiments employing this scheme of signalling an RT value per conflict, the SN may initiate release of the conflicting configuration in the case where its RT is not met. However, with the use of a single value of TRT, this is not possible since the SN is only able to determine and report that the TRT is not met. It then needs to indicate AR per conflict to the MN to identify which action to take and so the resolution involves two separate steps.

Another embodiment concerns another solution for coordinating UE capabilities in case of LTE 5G DC, namely by dynamic change of UE capabilities. It is noted that for NR it has been agreed that the UE may dynamically change its UE capabilities. In particular, it may indicate to the network that some of its UE capabilities are temporarily not available. This dynamic change will only be supported for a few limited capabilities.

In this approach the UE indicates, after a change of a first RAT configuration affecting the second RAT, to the network node controlling the second RAT that its UE capabilities have changed. Also with this approach it is possible to support negotiation between the network nodes e.g. in case one node wishes to take larger portion of the UE capabilities like configuring a conflicting band or BC.

A particular characteristic of this approach is that it involves no direct communication between the network nodes involved Instead, the UE acts as an intermediary between the nodes. The solution does not require the network nodes to comprehend configuration or capability information concerning the other RAT.

FIGS. 21-23 relate to an embodiment whereby the capability coordination is performed by dynamic change of the UE capabilities i.e. where the UE indicates that certain capabilities are suspended. E.g. the UE indicates that some of the available UE memory is suspended, or that it is temporarily not possible to configure some band or band combination. FIG. 21 shows a message exchange which shows an initial capability transfer where the network, when requesting the UE to provide UE capability information, may provide configuration parameters related to dynamic capability update, such as a field indicating that dynamic capability update is allowed or a prohibit timer controlling how frequently the UE is allowed to indicate UE capability changes.

Typical examples of the capabilities that may be changed dynamically are as follows:

Available UE memory i.e. what is available to the MN may be reduced if the SN requires more (i.e. shared memory);

The bands or band combinations i.e. the MN may not be able to configure an LTE carrier on a particular frequency band anymore because the SN wants to configure the UE with an NR carrier on another particular frequency (e.g. same or conflicting one);

Note that embodiments of the invention recognise 2 particular basic dependency cases:

a) Shared resources e.g. memory. Here the MN can allocate a portion or percentage to the SN based on negotiation; and b) Conflicting resources e.g. bands. Here the MN needs to chose between different competing options.

In response, the UE may indicate that certain capabilities are suspended because, for instance, due to a configuration by the other RAT.

In FIG. 22, the UE initiates a subsequent UE capability change in Message 3 i.e. a new suspension or that a previously suspended capability is available again. The network may elect to accept this request or reject it. If it elects to accept, then the network may need to change the current configuration (in Message 4). The latter, in particular, applies in case the current radio configuration requires the capabilities the UE wishes to suspend. E.g. the UE may wish to suspend a band currently used by one of its serving cells.

In FIG. 23, the network requests resumption of a suspended capability which the UE may either accept or reject.

Alternatively, as shown in FIG. 24, the UE may indicate that a suspended capability has become available again or can be resumed which the network may confirm, although this is optional.

FIGS. 25 and 26 illustrate how the dynamic change of UE capabilities may be used to coordinate UE capabilities in case of LTE-NR DC. With this solution, the network nodes can interact or negotiate without direct interaction and without having to comprehend capability or configuration information related to the other RAT. This is because the UE performs the function of intermediary between the connected nodes. Even though the UE is an intermediary, the network is still in control of the configuration that results. In these embodiments, there is no MN and SN, as each node is equal i.e. it is a symmetrical protocol. One node may imitate an action, while the other node may reject it. In order to operate in this way, an associated parameter is exchanged via the UE. The negotiation again uses a criterion, as before, e.g. some measure of throughput. Importantly, these embodiments honour the general principle that the configuration respects the UE capabilities and no attempt is made to configure the UE in a way which it cannot support.

FIG. 25 shows a first and basic message exchange between the UE and first and second network nodes (NN1 and NN2). I.e. NN1 initiates a configuration that limits what NN2 can configure in future, but it does not require NN2 to adjust the current configuration.

The UE has a first radio connection (RC1) to a first node (NN1) using a first Radio Access Technology (RAT1 e.g. LTE) and a second radio connection (RC2) to a second node (NN2) using a second RAT (RAT2 e.g. NR, as in case of IRAT DC).

1: Now NN1 initiates a configuration that affects what NN2 can still configure (e.g. it limits bands).

2. The UE provides an update of RAT2 UE capabilities to NN2 i.e. it indicates that certain capabilities are suspended (e.g. some bands, part of the L2 buffer).

3: NN2 confirms that it accepts the requested suspension of RAT2 UE capabilities 4: The UE confirms the configuration as initiated by NN1 in message 1

Message 3 may not be needed in all cases, but may be used in case the UE initiated suspension collides with an NN2-initiated reconfiguration that requires the use of RAT2 UE capabilities that the UE requests to be suspended.

There is no negotiation taking place here and hence no real need for an associated parameter (throughput), although it could be useful to always include such a parameter (to handle certain collision cases, as mentioned in the previous paragraph).

FIG. 26 illustrates the message exchanges between a UE and two network nodes, NN1 and NN2. In this particular case, NN1 wishes to initiate a configuration that requires that a certain suspended capability is resumed.

The messages are:

1. NN1 requests resumption of suspended RAT1 UE capabilities (i.e. a larger piece of the UE capabilities) and indicates the throughput gain it can achieve with the resumed capabilities.

2. The UE provides an update of UE capabilities to NN2 i.e. it requests suspension of some of the UE capabilities (i.e. due to resumption in message 1), also forwarding the throughput gain indicated by NN1.

3. If the requested suspension results in a throughput reduction that exceeds the throughput gain indicated in the suspension request, NN2 accepts the requested suspension of UE capabilities. It provides a confirmation, possibly with or after reconfiguring the UE, if the current configuration towards NN2 cannot be maintained without the capabilities that the UE requested to be suspended.

4. The UE confirms resumption of the RAT2 UE capabilities as requested by NN1 in message 1.

5. NN1 initiates reconfiguration, making use of the RAT1 UE capabilities that have been successfully resumed.

Unlike the scheme in FIG. 25, this sequence supports negotiation. For instance, in case NN1 wishes to configure a cell on a band that is not supported along with the current RC2.

In such a case, NN1 can indicate in message 1 the throughput that is gained if the cell would be configured or if the RAT1 UE capability would be resumed. The UE includes this information when requesting NN2 to suspend the conflicting RAT2 UE capabilities. If the throughput reduction due to suspending these RAT2 UE capabilities is less than the indicated throughput gain, NN2 is assumed to accept the suspension request.

The UE does not confirm resumption (as in message 4) and NN2 does not confirm suspension (as shown in message 3) before reconfiguring the UE according to the reduced UE capabilities. In other words, UE capabilities should be respected at all times, and should avoid introducing any special behaviour for temporary cases.

In all embodiments, implementation is effected by means of programmed instructions in the UE and/or the network nodes. FIG. 27 shows a generalised form of network construction, whereby a UE 300 is in radio communication with a first node 100 and a second node 200. The first and second nodes are in communication with each other via a backhaul connection. Depending on the particular embodiment of the present invention which is being implemented, the first node may be a master node and the second node may be a secondary node. Alternatively, the nodes may operate according to a symmetrical protocol.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a first base station which is a master base station for a terminal configured with an inter radio access technology (RAT) dual connectivity with the first base station of a first RAT and a second base station of a second RAT in a wireless communication system, the method comprising:
    transmitting, to the terminal, a first message requesting capability information for a RAT type of the inter-RAT dual connectivity;
    receiving, from the terminal, a second message including the capability information of the terminal for the RAT type, the capability information comprising information on at least one band combination supported by the terminal for the RAT type; and
    transmitting, to the second base station which is a secondary base station for the terminal, a third message requesting to configure a secondary cell group (SCG) for the terminal, the third message including the capability information and information on a restriction to be configured for the terminal,
    wherein the restriction is associated with a band combination and is identified based on the capability information.

2. The method of claim 1,
    wherein the information on the restriction includes an indicator for the band combination which is allowed for the second base station, and
    wherein the band combination being identified from the at least one band combination.

3. The method of claim 2, further comprising receiving, from the second base station, a fourth message including a response to the restriction.

4. The method of claim 1, wherein the first RAT includes a long term evolution (LTE) and the second RAT includes a new radio (NR).

5. A method performed by a second base station which is a secondary base station for a terminal configured with an inter radio access technology (RAT) dual connectivity with a first base station of a first RAT and the second base station of a second RAT in a wireless communication system, the method comprising:
    receiving, from the first base station which is a master base station for the terminal, a first message requesting to configure a secondary cell group (SCG) for the terminal, the first message including capability information of the terminal and information on a restriction to be configured for the terminal; and
    communicating, with the terminal, based on the capability information,
    wherein, based on a second message transmitted from the first base station to the terminal for requesting the capability information for a RAT type of the inter-RAT dual connectivity, the capability information is generated for the RAT type,
    wherein the capability information includes information on at least one band combination supported by the terminal for the RAT type and is transmitted from the terminal to the master base station, and
    wherein the restriction is associated with a band combination and is identified based on the capability information.

6. The method of claim 5,
    wherein the information on the restriction includes an indicator for the band combination which is allowed for the second base station, and wherein the band combination being identified from the at least one band combination.

7. The method of claim 6, further comprising transmitting, to the first base station, a third message including a response to the restriction.

8. The method of claim 5, wherein the first RAT of includes a long term evolution (LTE) and the second RAT includes a new radio (NR).

9. A first base station which is a master base station for a terminal configured with an inter radio access technology (RAT) dual connectivity with the first base station of a first RAT and a second base station of a second RAT in a wireless communication system, the first base station comprising:
a transceiver configured to transmit and receive a signal; and
a controller coupled with the transceiver and configured to:
transmit, to the terminal, a first message requesting capability information for a RAT type of the inter-RAT dual connectivity,
receive, from the terminal, a second message including the capability information of the terminal for the RAT type, the capability information comprising information on at least one band combination supported by the terminal for the RAT type, and
transmit, to the second base station which is a secondary base station for the terminal, a third message requesting to configure a secondary cell group (SCG) for the terminal, the third message including the capability information and information on a restriction to be configured for the terminal,
wherein the restriction is associated with a band combination and is identified based on the capability information.

10. The first base station of claim 9,
wherein the information on the restriction includes an indicator for the band combination which is allowed for the second base station, and
wherein the band combination being identified from the at least one band combination.

11. The first base station of claim 10, wherein the controller is further configured to receive, from the second base station, a fourth message including a response to the restriction.

12. The first base station of claim 9, wherein the first RAT includes a long term evolution (LTE) and the second RAT includes a new radio (NR).

13. A second base station which is a secondary base station for a terminal configured with an inter radio access technology (RAT) dual connectivity with a first base station of a first RAT and the second base station of a second RAT in a wireless communication system, the second base station comprising:
a transceiver configured to transmit and receive a signal; and
a controller coupled with the transceiver and configured to:
receive, from the first base station which is a master base station for the terminal, a first message requesting to configure a secondary cell group (SCG) for the terminal, the first message including capability information of the terminal and information on a restriction to be configured for the terminal, and
communicate, with the terminal, based on the capability information,
wherein, based on a second message transmitted from the first base station to the terminal for requesting the capability information for a RAT type of the inter-RAT dual connectivity, the capability information is generated for the RAT type,
wherein the capability information includes information on at least one band combination supported by the terminal for the RAT type and is transmitted from the terminal to the master base station, and
wherein the restriction is associated with a band combination and is identified based on the capability information.

14. The second base station of claim 13,
wherein the information on the restriction includes an indicator for the band combination which is allowed for the second base station, and
wherein the band combination being identified from the at least one band combination.

15. The second base station of claim 14, wherein the controller is further configured to transmit, to the first base station, a third message including a response to the restriction.

16. The second base station of claim 13, wherein the first RAT includes a long term evolution (LTE) and the second RAT includes a new radio (NR).

* * * * *